(12) United States Patent
Kachiwazaki et al.

(10) Patent No.: US 12,465,826 B2
(45) Date of Patent: Nov. 11, 2025

(54) GAME PADDLE

(71) Applicant: Sport Squad, Inc., Rockville, MD (US)

(72) Inventors: Fabio Kachiwazaki, São Paulo (BR);
Austin Kim, Columbia, MD (US);
Richard Lee, Potomac, MD (US)

(73) Assignee: Sport Squad, Inc., North Bethesda, MD (US)

( * ) Notice: Subject to any disclaimer, the term of this patent is extended or adjusted under 35 U.S.C. 154(b) by 0 days.

(21) Appl. No.: 19/027,671

(22) Filed: Jan. 17, 2025

(65) Prior Publication Data
US 2025/0161771 A1    May 22, 2025

Related U.S. Application Data

(63) Continuation of application No. 18/389,174, filed on Nov. 13, 2023.
(Continued)

(51) Int. Cl.
*A63B 59/42*  (2015.01)
*A63B 60/54*  (2015.01)
(Continued)

(52) U.S. Cl.
CPC ............ *A63B 59/42* (2015.10); *B32B 3/08* (2013.01); *B32B 3/12* (2013.01); *B32B 5/02* (2013.01); *B32B 5/18* (2013.01); *A63B 60/54* (2015.10); *A63B 2209/02* (2013.01); *B32B 2262/106* (2013.01); *B32B 2266/0214* (2013.01)

(58) Field of Classification Search
CPC .... B32B 3/08; B32B 3/12; B32B 5/18; B32B 2262/106; B32B 2266/0214; A63B 59/42; A63B 2209/00; A63B 2209/02; A63B 60/54
See application file for complete search history.

(56) References Cited

U.S. PATENT DOCUMENTS 3,879,035 A * 4/1975 Danchulis .............. A63B 59/40
473/527
3,949,988 A    4/1976 Staufer
(Continued)

FOREIGN PATENT DOCUMENTS

CA    3038087 A    9/2020
CN    219167665 U    6/2023
(Continued)

OTHER PUBLICATIONS

Image of cutaway of Selkirk LABS Project 002 paddle (Aug. 2023), 1 page.
(Continued)

*Primary Examiner* — Eugene L Kim
*Assistant Examiner* — Amir A Klayman
(74) *Attorney, Agent, or Firm* — Bass Patent Law, LLC

(57) ABSTRACT

The present teachings generally include game paddles such as pickleball paddles. For example, a pickleball paddle disclosed herein may include a first surface, a second surface, and a core disposed therebetween, where the core defines a plurality of gaps that can accommodate one or more fillers, e.g., to provide vibration dampening and/or to otherwise affect performance, comfort, and enjoyment. In some aspects, a frame may also or instead include a filler disposed therein and/or adjacent thereto.

20 Claims, 31 Drawing Sheets

Related U.S. Application Data

(60) Provisional application No. 63/543,865, filed on Oct. 12, 2023, provisional application No. 63/535,565, filed on Aug. 30, 2023.

(51) Int. Cl.
*B32B 3/08* (2006.01)
*B32B 3/12* (2006.01)
*B32B 5/02* (2006.01)
*B32B 5/18* (2006.01)

(56) References Cited

U.S. PATENT DOCUMENTS

| | | | |
|---|---|---|---|
| 4,130,277 A | 12/1978 | Marks | |
| 4,192,506 A * | 3/1980 | Sofia | A63B 60/00 473/548 |
| 4,194,738 A * | 3/1980 | Inoue | A63B 49/10 473/535 |
| 4,227,692 A * | 10/1980 | Castelli | A63B 60/40 473/525 |
| 4,331,331 A * | 5/1982 | Rodgers, Jr. | A63B 60/00 473/544 |
| 4,379,554 A | 4/1983 | Schuyler et al. | |
| 5,172,911 A * | 12/1992 | Chang | A63B 60/00 473/521 |
| 5,454,562 A * | 10/1995 | Sommer | A63B 60/54 473/523 |
| 5,649,873 A * | 7/1997 | Fuller | A63B 53/0466 473/332 |
| 5,961,404 A | 10/1999 | Gormley | |
| 9,993,707 B2 * | 6/2018 | Davis | A63B 60/00 |
| 10,377,093 B2 | 8/2019 | Filippini | |
| 11,597,169 B2 | 3/2023 | Simmons | |
| 11,612,792 B2 | 3/2023 | Marshall | |
| 12,370,424 B1 * | 7/2025 | Kim | B32B 5/18 |
| 2011/0201461 A1 | 8/2011 | Gazzara et al. | |
| 2015/0224370 A1 * | 8/2015 | Yamamoto | A63B 49/10 156/185 |
| 2017/0021247 A1 * | 1/2017 | Marvin | A63B 59/40 |
| 2017/0021248 A1 * | 1/2017 | Marvin | A63B 59/45 |
| 2017/0136325 A1 * | 5/2017 | Fox | A63B 59/42 |
| 2018/0104555 A1 * | 4/2018 | Taylor | A63B 59/45 |
| 2018/0353820 A1 * | 12/2018 | Davis | A63B 59/70 |
| 2020/0290243 A1 | 9/2020 | Avnery et al. | |
| 2020/0360778 A1 * | 11/2020 | Lee | A63B 60/04 |
| 2020/0398130 A1 * | 12/2020 | Lee | A63B 59/42 |
| 2021/0252356 A1 | 8/2021 | Thurman et al. | |
| 2021/0252357 A1 * | 8/2021 | Lee | A63B 59/42 |
| 2021/0260452 A1 | 8/2021 | Zheng | |
| 2022/0032141 A1 | 2/2022 | Brents et al. | |
| 2022/0040937 A1 | 2/2022 | Simmons | |
| 2023/0047371 A1 * | 2/2023 | Lee | A63B 60/00 |
| 2023/0149784 A1 | 5/2023 | Lee | |
| 2023/0191215 A1 * | 6/2023 | Barnes | A63B 59/42 473/527 |
| 2023/0356048 A1 | 11/2023 | Junkins | |
| 2023/0415010 A1 * | 12/2023 | Luo | A63B 59/42 |
| 2024/0050822 A1 | 2/2024 | Kapheim | |
| 2024/0165468 A1 | 5/2024 | Shu | |
| 2024/0424366 A1 * | 12/2024 | Li | A63B 59/48 |
| 2025/0018264 A1 * | 1/2025 | Filippini | A63B 60/08 |
| 2025/0083010 A1 * | 3/2025 | Meyer | B32B 27/12 |
| 2025/0114674 A1 * | 4/2025 | Hudes | A63B 59/42 |
| 2025/0161772 A1 | 5/2025 | Kachiwazaki et al. | |

FOREIGN PATENT DOCUMENTS

| | | | |
|---|---|---|---|
| CN | 219701015 U | 9/2023 | |
| WO | WO-2022182992 A1 * | 9/2022 | A63B 59/42 |
| WO | 2022217045 A1 | 10/2022 | |
| WO | WO-2024076417 A1 * | 4/2024 | |
| WO | 2025049122 A1 | 3/2025 | |

OTHER PUBLICATIONS

Selkirk LABS Project 002, website captured by Wayback Machine on Jun. 2, 2022, currently available at https://www.selkirklabs.com/products/selkirk-labs-project-002 (website capture date is Jun. 2, 2022), 3 pages.

U.S. Appl. No. 63/535,565, filed Aug. 30, 2023, Fabio Kachiwazaki.

U.S. Appl. No. 63/543,865, filed Oct. 12, 2023, Fabio Kachiwazaki.

Gearbox, "Pro Power Elongated," https://gearboxsports.com/collections/all-pickleball-paddles/products/pro-power-elongated, 2023, 9 pages.

ISA/EP, PCT Application No. PCT/US24/42535, International Search Report and Written Opinion dated Nov. 12, 2024, 15 pages.

U.S. Appl. No. 19/028,832, Non-Final Office Action dated Mar. 12, 2025, 15 pages.

U.S. Appl. No. 19/028,832, Notice of Allowance dated Apr. 9, 2025, 9 pages.

* cited by examiner

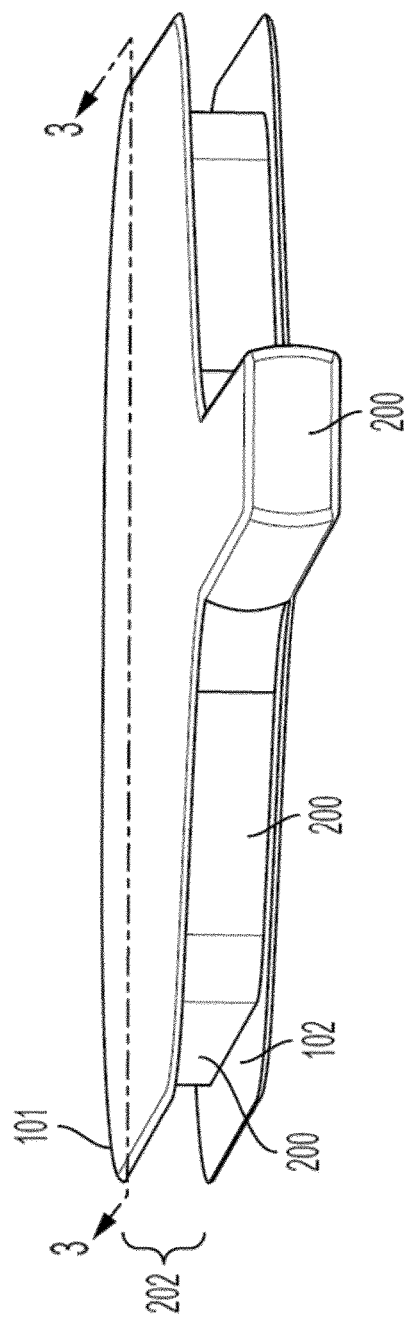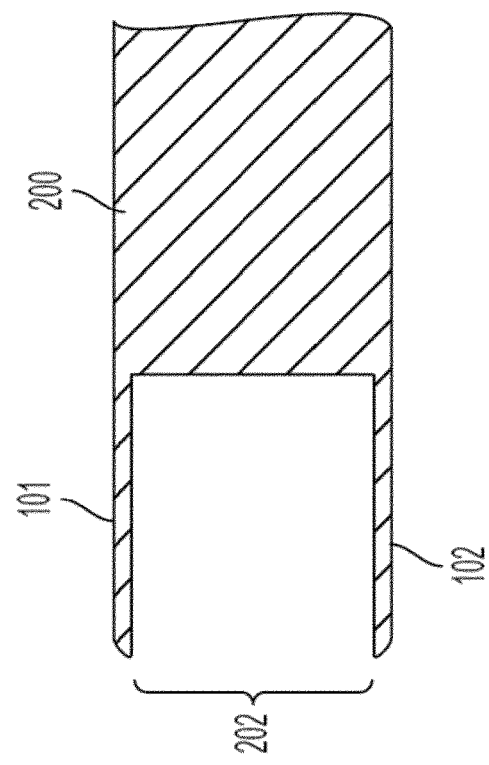

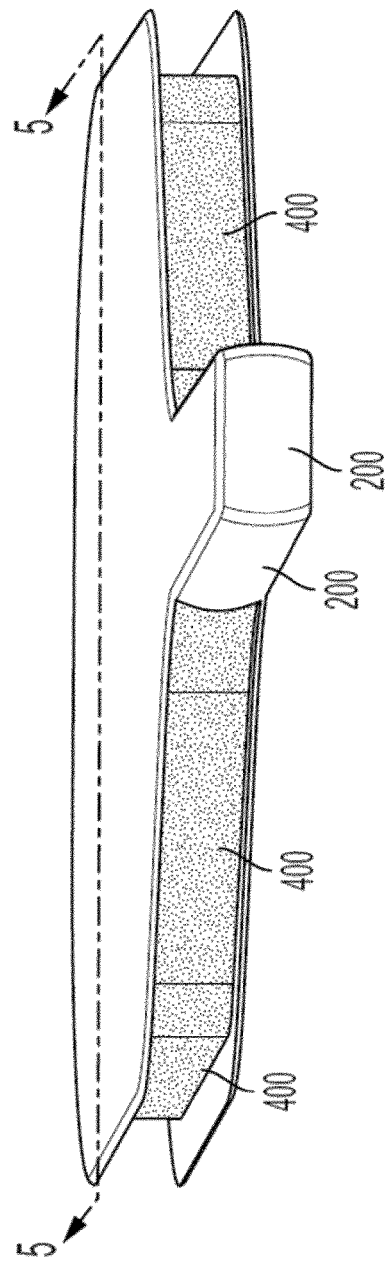
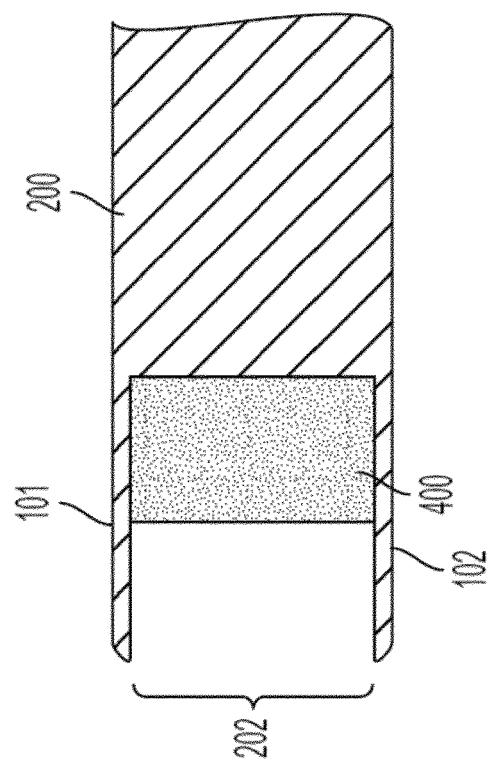
FIG. 4
FIG. 5

GAME PADDLE

CROSS-REFERENCE TO RELATED APPLICATIONS

This application is a continuation of U.S. patent application Ser. No. 18/389,174 filed on Nov. 13, 2023, which claims benefit to U.S. provisional application No. 63/535,565 filed on Aug. 30, 2023, and U.S. provisional application No. 63/543,865 filed on Oct. 12, 2023, where each of the foregoing is incorporated by reference herein in its entirety.

FIELD OF THE INVENTION

The present general inventive concept is directed to a paddle and a method for manufacturing the paddle.

DESCRIPTION OF RELATED ART

Paddles for paddle sports have been used for ages. A paddle typically refers to a paddle that is not comprised of strings (such as a tennis racket). Paddles are used to play games such as pickleball, paddleball, etc.

What is needed is paddles that can provide better performance for players.

SUMMARY OF THE INVENTION

It is an aspect of the present invention to provide an improved solid game paddle and method for its manufacture.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2 is a diagonal view showing the paddle after it is cored out, according to an embodiment;

FIG. 3 is a cross section of FIG. 2, according to an embodiment;

FIG. 4 is a diagonal view of the paddle with foam added, according to an embodiment;

FIG. 5 is a cross section of FIG. 4, according to an embodiment;

DESCRIPTION OF THE PREFERRED EMBODIMENTS

Figure 1A:
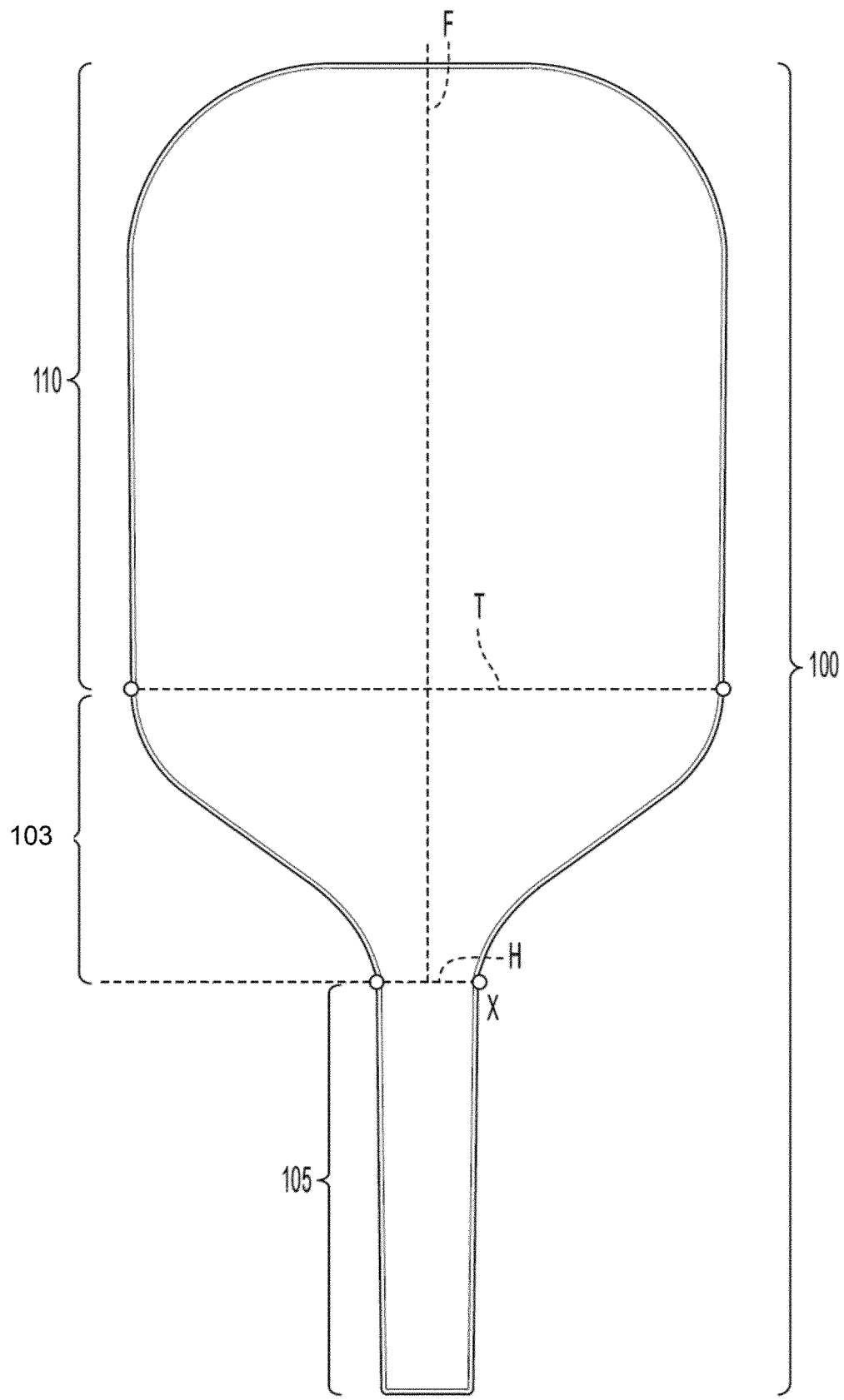
FIG. 1A is a drawing showing a front view of a paddle, according to an embodiment.

Reference will now be made in detail to the presently preferred embodiments of the invention, examples of which are illustrated in the accompanying drawings, wherein like reference numerals refer to like elements throughout.

A paddle can be used to play games like pickleball, racquetball, paddleball, etc. The paddle is solid, meaning that it is not made of string with holes between the string (such as a tennis racket). The paddle can have some foam (or other filler) on the inside alongside other material(s) such as core, the filler can serve to increase power, soften feel and reduce vibration.

In an embodiment, the paddle can be made with a manufacturing process. The process can begin with using an original paddle. The paddle has a front and back surface and a core on the inside, in a "sandwich structure." The front and back surfaces can be made from any material, such as one, two three, four or more layers of unidirectional or weave of carbon, glass, or any natural or synthetic fiber and prepreg impregnated with any kind of resin. The core can be comprised of any open-cell structure or lattice (e.g., honeycomb) of polypropylene, aluminum, NOMEX, KEVLAR ARAMID, or any other synthetic or natural material.

The process then will core out (remove) a portion of the core. The portion of the core that is removed (gap) depends on the embodiment, as in different embodiments, different portions of the core can be cored out. The gap can be from 0.1 to 100 mm deep (from the edge to the center of the paddle). The process will then use a first filler (e.g., foam) to fill in the cored out portion (gap) of the core. In an embodiment, instead of the first filler the cored out portion (gap) can be left hollow.

The process will then insert a first filler (e.g., foam) into the gap. Note that the first filler can be a single material or a combination of at least two different materials. The process will then wrap a frame (such as a carbon frame) around the perimeter of the entire paddle. In an embodiment, the frame can be an airtight hollow cuboid structure and has a second filler (e.g., foam) inside the frame. Note that in an embodiment, the frame may not be airtight. The second filler can be made from a single material or a combination of at least two different materials. In alternate embodiment, the frame can simply be a solid material wrapped around the perimeter. The second filler can be the same material(s) as the first filler or it can be a different material(s). In an embodiment, the frame can also be hollow. Note that a frame aspect ratio is defined as the height of the frame divided by the width of the frame, and in an embodiment, the frame aspect ratio would be lower than a predefined number (e.g., 4).

Figure 1B:
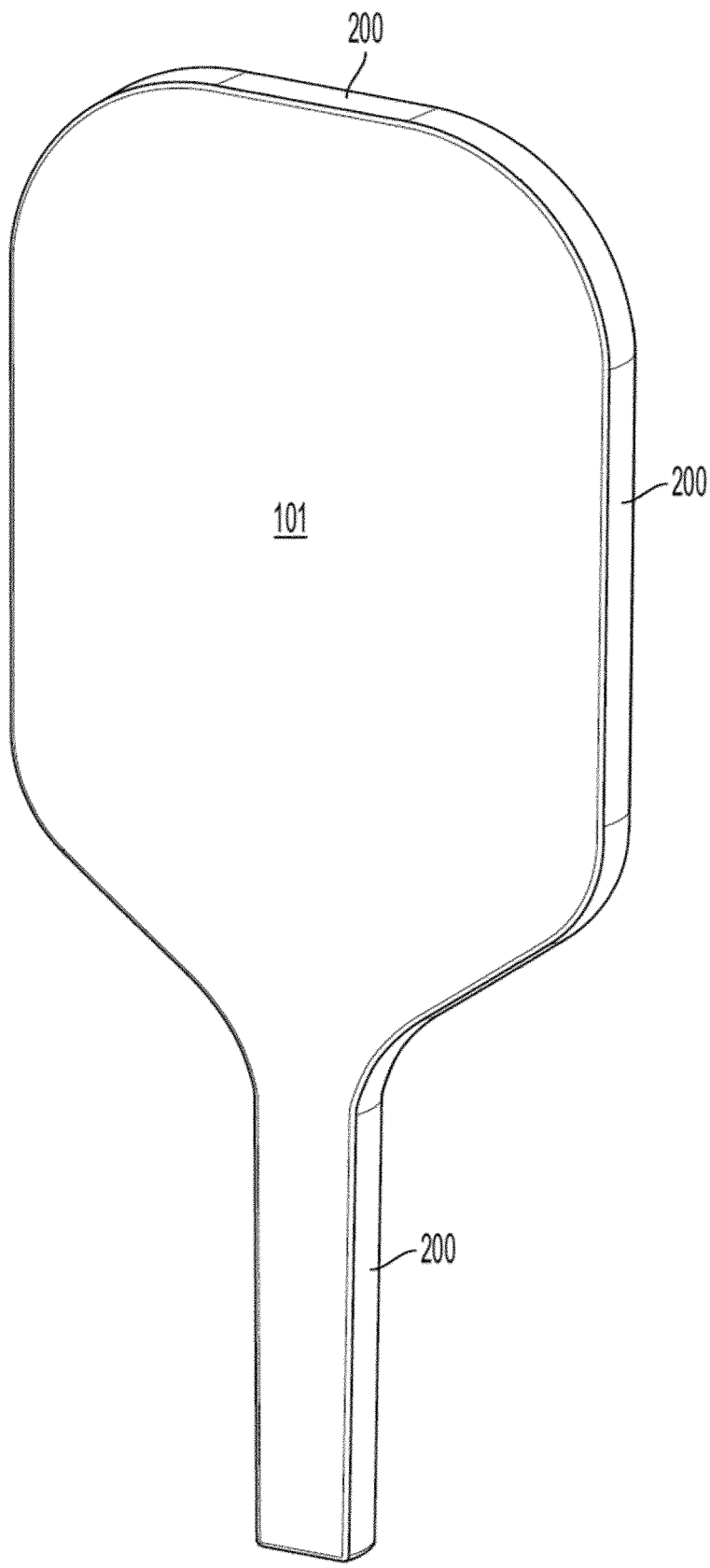
FIG. 1B is a drawing showing a top perspective view of the paddle, according to an embodiment.
Figure 1C:
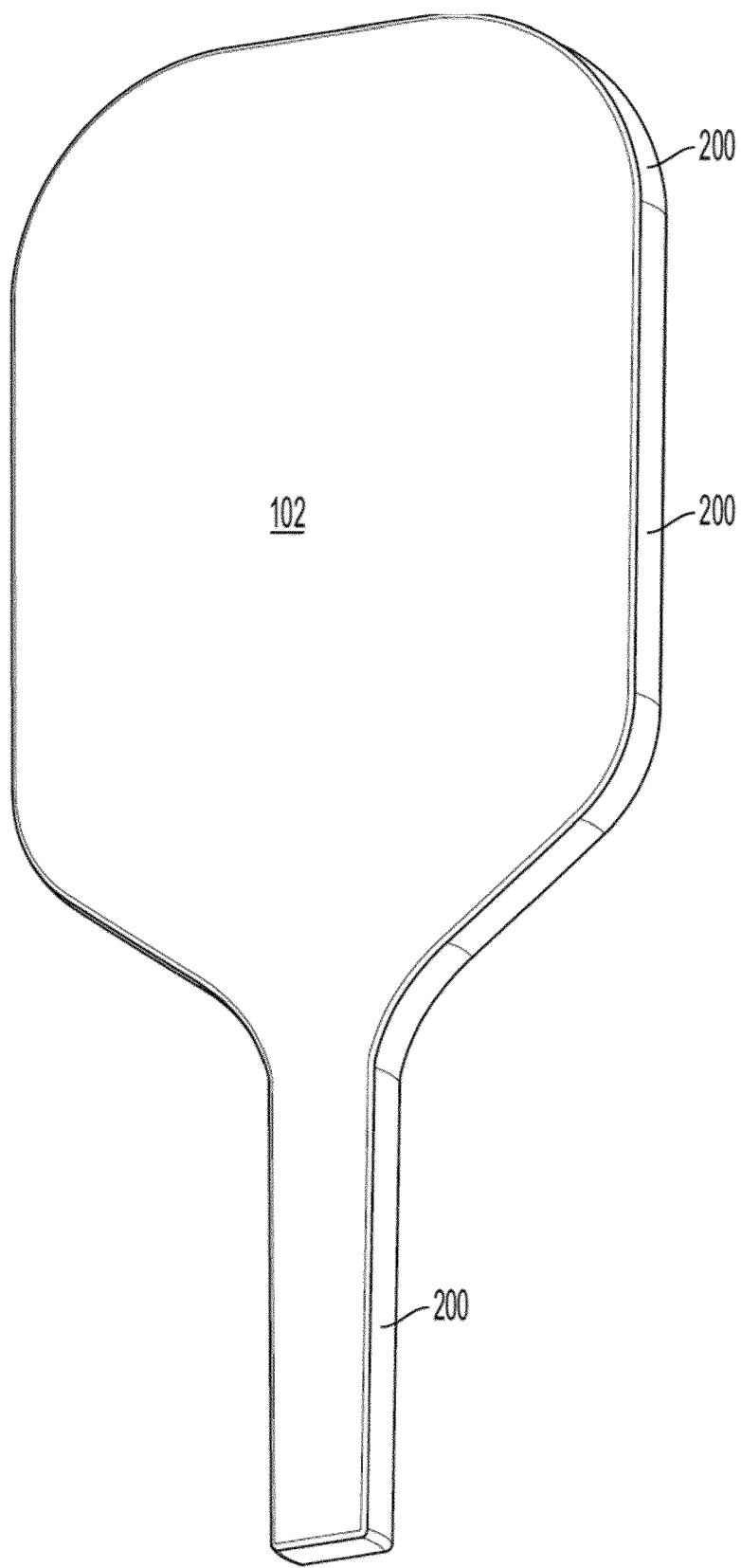
FIG. 1C is a drawing showing a back perspective view of the paddle, according to an embodiment.

FIG. 1A is a drawing showing a front view of an original paddle 100, according to an embodiment. The front view and back view are identical. FIG. 1B is a drawing showing a top perspective view of the paddle, according to an embodiment. FIG. 1C is a drawing showing a back perspective view of the paddle, according to an embodiment. The paddle 100 is utilized to create the improved paddle as described herein. Note that any paddles described herein are not limited to any particular shape and any shape and/or thickness can be used. The front surface 101 and the back surface 102 can be made from any material, such as 1-4 or more layers of unidirectional or weave of carbon, glass, or any natural or synthetic fiber and prepreg, impregnated with any kind of resin are commonly used for the composite materials. Typically, the front surface 101 and the back surface 102 are made from the same material, although this is not required. A handle 105 is on the bottom of the paddle 100 and a head 110 is above the handle 105. Example dimensions (in inches) for such a paddle can be, 15-17" (length)×9-7" (width), or 16.5"×7.5" or 16"×8". Grip length: 4-6", or 4.75-5.75". Grip circumference: 4-4.5", or 4-4.3", although these are just examples and any other dimensions can be used.

Note that the handle 105 can be defined as the bottom of the racket up unto the point where the curvature of the perimeter of the paddle (without a grip) starts to change (e.g., a straight line starts to curve). This point is shown in FIG. 1A by the dotted line 'H'. The face of the paddle can be considered the rest of the paddle, that is from the handle to the top of the paddle. The face can be broken up into two sections, the head 110 and the throat 103. The head 110 is from the top of the paddle down to where the perimeter starts to curve (from a straight edge) which is shown in FIG. 1A by the dotted line T. The throat 103 is the region between the head and the handle. Thus, the face of the paddle comprises only the head 110 and the throat 103 but not the handle 105. The height of the face is shown by the dotted line 'F' in FIG. 1A. All sections (e.g., head, throat, handle) are delineated by horizontal lines. These sections can be considered to extend throughout the thickness of the paddle.

An alternative method of determining the head and the throat sections is as follows. The height of the face is determined by measuring the distance from the top of the paddle to where the handle begins (which can be determined based on when the curvature becomes straight, or by the user of a different material for the handle, etc.) The bottom one third of this height (e.g., the bottom ⅓ of the face) is the throat, and the top two thirds of this height (e.g., the top ⅔ of the face) is the head. As an example of this method, assume the height of the face (shown as vertical line F) in FIG. 1A is 10 inches (from the top of the paddle to the top of the handle). The 10 inches does not include the handle. Then the throat cutoff line (shown as horizontal line T) is just at the lower ⅓ of the face height, that is 3.33 inches over the top of the handle is the throat (or 6.66 inches below the top of the paddle). The region below the throat cutoff line and above the handle is the throat region. While FIG. 1A is drawn as 2-dimensional, the regions described herein extend into the thickness of the paddle.

FIG. 2 is a diagonal view showing the paddle after it is cored out, according to an embodiment. A core 200 is present between the front surface 101 and the back surface 102. The core 200 can be comprised of any open-cell structure (or a plastic sheet closing the cells), lattice (e.g., honeycomb), or any other such structure, comprised of polypropylene, aluminum, NOMEX, KEVLAR or any other synthetic or natural material. "Coring out" comprises removing sections of the core 200 from the paddle 100. This can be done by using a drill or other tool which creates a gap 202 where the core 200 previously existed. See operation 3102 and its accompanying description for more information on the coring out operation.

FIG. 3 is a cross section of FIG. 2, according to an embodiment. Between the top surface 101 and bottom surface 102 is the gap 202. The gap 202 can be from 0.1 to 100 mm depth (from the edge to the center of the paddle), it can be continuous around all the paddle, or split in two, three, four or more sections of different lengths, depths, and shapes. The height of the gap can vary from 0.1 to 25 mm or to the max thickness of the core. The gap can be of any shape, concave, convex, U shape, or others.

FIG. 4 is a diagonal view of the paddle with foam added, according to an embodiment. A first filler 400 is added in the gap 202 although it does not completely fill the gap 202 as room is left for a frame (e.g., carbon frame). The first filler 400 can be EVA foam, polymer, thermoplastic, thermoset, thermoplastic elastomer, elastomer, rubber, foam, expandable material, or a mixture of any combination of these. The first filler 400 can be of any density, viscosity, and hardness.

See operation 3103 and its accompanying description for more information on how the filler is applied.

The first filler 400 (and the gap 202 which it fills) can be of any cross-section shape, the height can vary from 0.1 to 25 mm or to the max thickness of the core, the width (distance from the frame wall to the core) can vary from 0.1 to 50 mm. The first filler 400 can be continuous around all the core or can be split in two, three, or more sections with same or different geometries, dimensions, and materials. The first filler 400 can surround the entire paddle, just the head, or just specific areas.

FIG. 5 is a cross section of FIG. 4, according to an embodiment. Shown inside the gap 202 is the first filler 400.

Figure 6A:
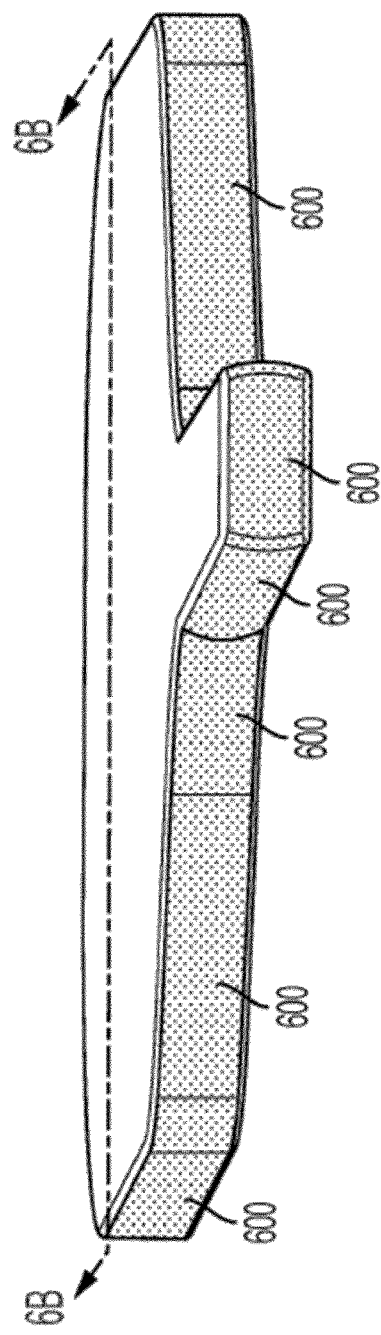
FIG. 6A is a diagonal view of the paddle with a frame added, according to an embodiment.

FIG. 6A is a diagonal view of the paddle with a frame added (such as a carbon frame), according to an embodiment. A frame 600 is added around the edge of the paddle 100. The frame 600 can be comprised of carbon, glass, or any synthetic or natural fiber with resin, plastic, rubber, metal, or any material that provides a rigid structure. The frame 600 can be of any cross-section shape, height, width, and length. It can be an entire piece or can be split into two, three, or more sections with same or different geometries and dimensions. The frame 600 can surround the entire paddle, just the head, just the handle, or just specific areas. See operation 3104 and its accompanying description for more information on how the frame is applied. An edge guard (not pictured) can be optionally used or not to cover the frame and a small area of the surfaces on both sides.

Figure 6B:
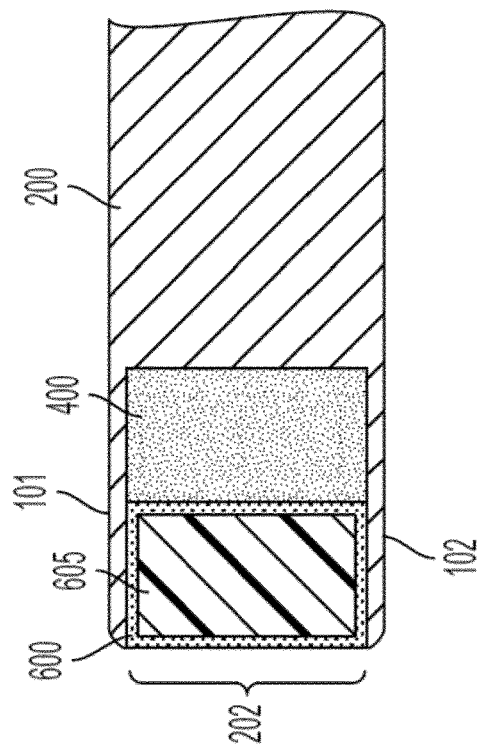
FIG. 6B is a cross section of FIG. 6A, according to an embodiment.

FIG. 6B is a cross section of FIG. 6A, according to an embodiment. The frame 600 is a hollow cuboid (or other) structure which houses a second filler 605. The second filler 605 can be polymer, thermoplastic, thermoset, thermoplastic elastomer, elastomer, rubber, foam, expandable material, or a mixture of any combination of these. The second filler 605 can be of any density, viscosity, and hardness, and can be a single material or combination of different materials. The second filler 605 can be the same material as the first filler 400 or it can be a different material. In an embodiment, the second filler 605 can also be pressurized air (high pressure) since the frame 600 can be airtight or it can be hollow. Also shown is the core 200. When the frame is a shell structure as shown, the frame wall can range from 0.01-10 mm, 0.1-10 mm, or 0.1-4 mm, or other ranges. Frame height: 1-20 mm or to the max thickness of the paddle. Frame width can be 1-30 mm, or 5-15 mm. The frame can also be a solid structure (not shell structure), in this case the examples of dimensions would be the same, but there's no wall thickness in this case.

Figure 7A:
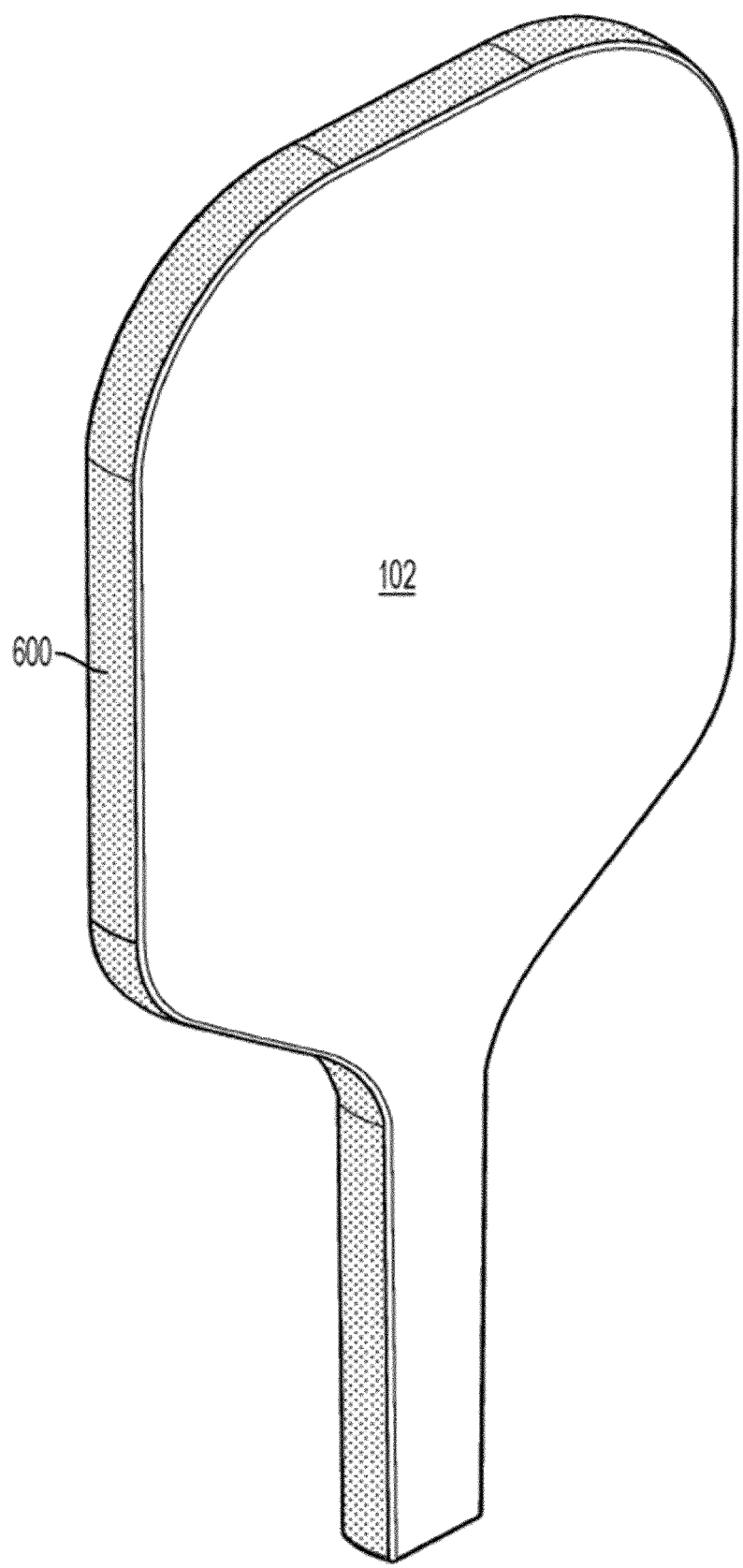
FIG. 7A shows a front view of the final paddle, according to an embodiment.
Figure 7B:
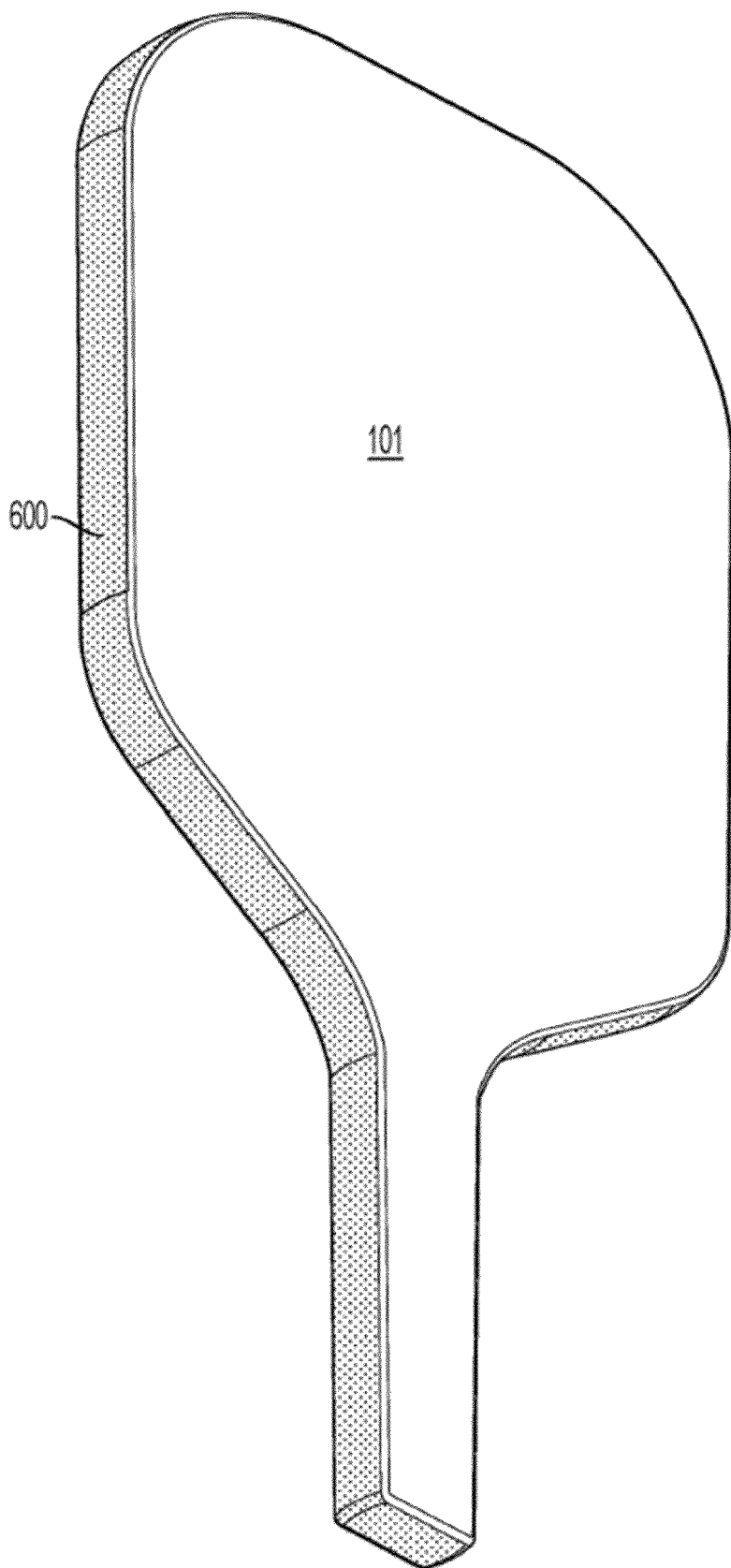
FIG. 7B shows a back view of the final paddle, according to an embodiment.

FIG. 7A shows a front view of the paddle with the frame installed, according to an embodiment. FIG. 7B shows a back view of the paddle with the frame installed, according to an embodiment. The paddle shown in FIGS. 7A and 7B is the final paddle after the manufacturing process is complete. The first filler 400 and the second filler 605 are not visible to the user because they are internal to the paddle. However, the first filler 400 and the second filler 605 are inside the paddle and hence the user cannot see them and may not even know the first filler 400 and the second filler 605 are present inside the paddle. With any of the embodiments described herein, the final paddle will appear like FIGS. 7A and FIG. 7B because the internal structure (e.g., core, first filler, second filler, etc.) would not be visible.

Figure 7C:
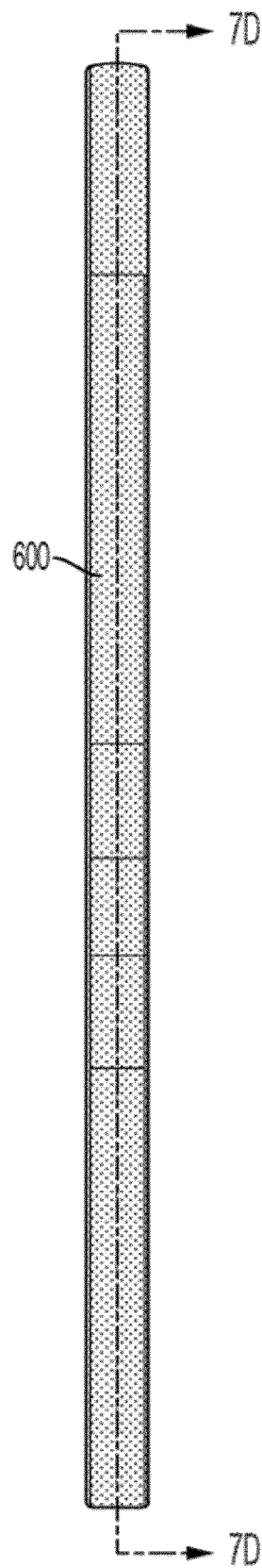
FIG. 7C shows a side view of the final paddle, according to an embodiment.
Figure 7D:
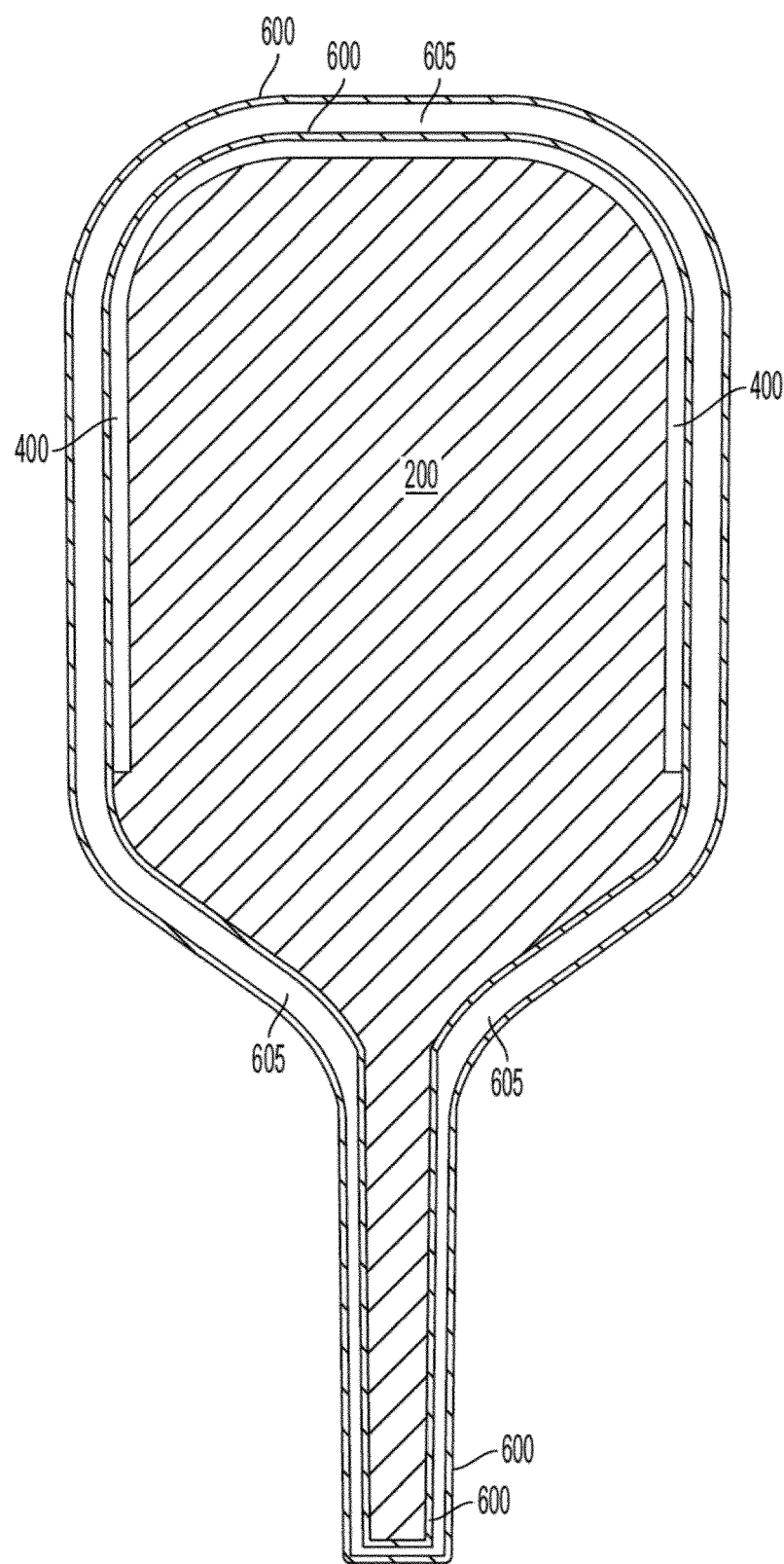
FIG. 7D shows a cross section shown in FIG. 7C, according to an embodiment.

FIG. 7C shows a side view of the final paddle, according to an embodiment. FIG. 7D shows a cross section shown in FIG. 7C, according to an embodiment. Shown is the frame 600 with the second filler 605 inside the frame 600. The first filler 400 is present inside the core 200 which fills the gap 202 previously made in the core 200.

Figure 7E:
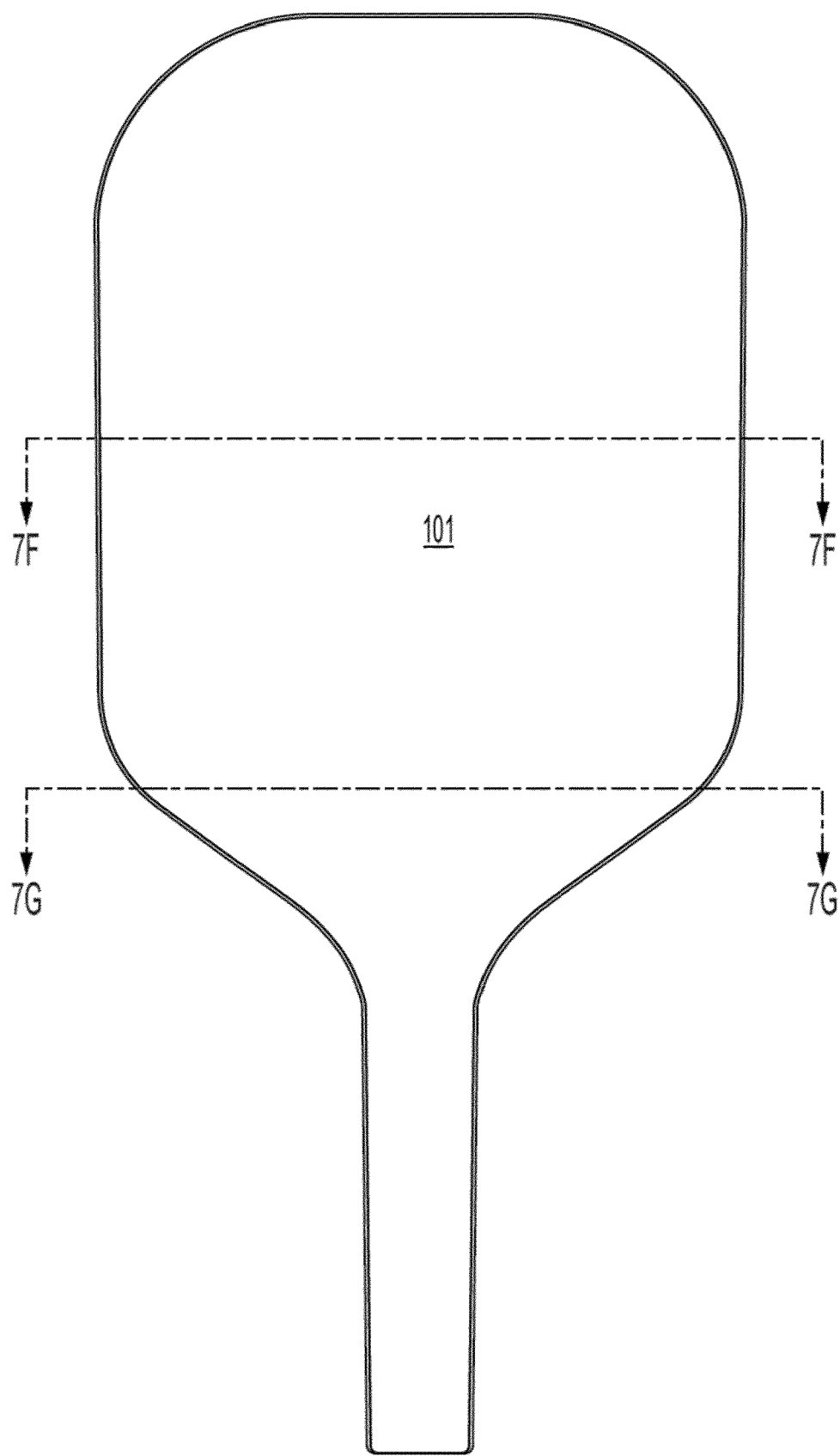
FIG. 7E shows a front view of the final paddle, according to an embodiment.
Figure 7F:
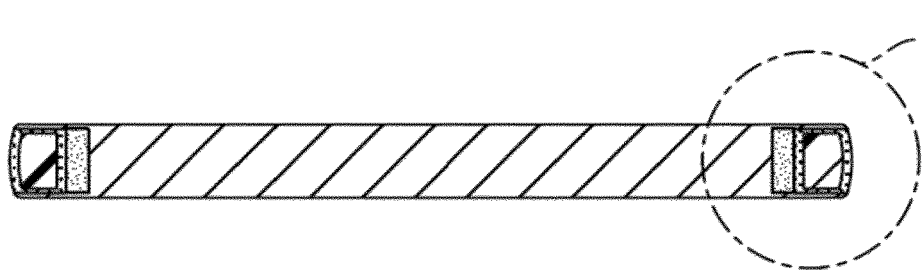
FIG. 7F shows a cross section from the view shown in FIG. 7E, according to an embodiment.
Figure 7G:
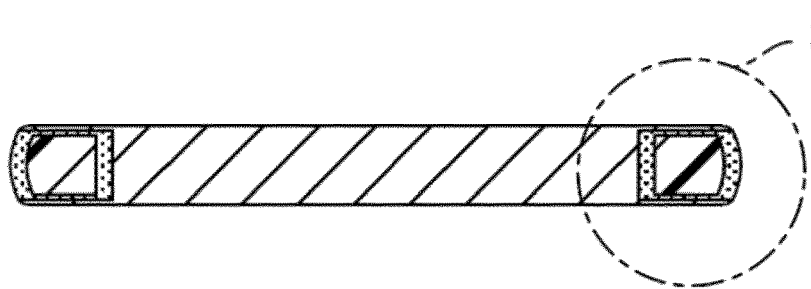
FIG. 7G shows a cross section from the view shown in FIG. 7E, according to an embodiment.
Figure 7H:
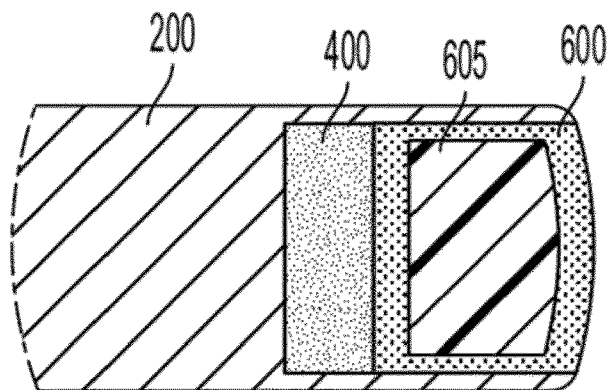
FIG. 7H shows a detailed view of the view shown in FIG. 7F, according to an embodiment.
Figure 7I:
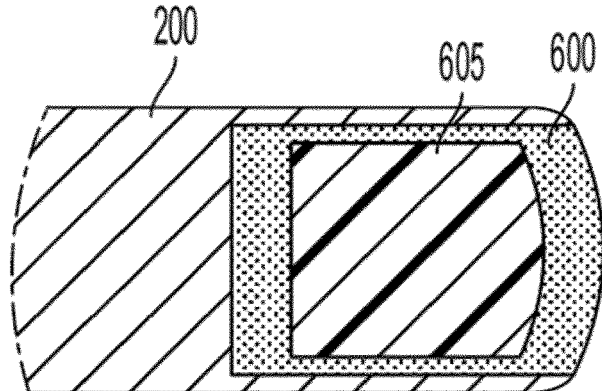
FIG. 7I shows a detailed view of the view shown in FIG. 7G, according to an embodiment.

FIG. 7E shows a front view of the final paddle, according to an embodiment. The back view of the final paddle is identical to the front view. Note that the frame surrounds the entire final paddle. In an embodiment, the frame does not surround the entire paddle but only a portion of it, for example, the frame can only surround a part of the head of the paddle, or just part of the handle, etc., FIG. 7F shows a cross section from the view shown in FIG. 7E, according to an embodiment. FIG. 7G shows a cross section from the view shown in FIG. 7E, according to an embodiment. Note that in FIG. 7G there is no first filler 400 (as shown in FIG. 7F) because the portion of the paddle shown in FIG. 7G was not cored out and hence no first filler 400 was applied to that region. FIG. 7H shows a detailed view of the view shown in FIG. 7F, according to an embodiment. Note that FIG. 7H shows a height and width measurement of the frame. The frame aspect ratio is the height/width. In one embodiment, the frame aspect ratio should be smaller than 4 (or smaller than equal to 4). In another embodiment, the frame aspect ratio should be smaller than 6, or smaller than 4, or smaller than 2, or other numbers. FIG. 7I shows a detailed view of the view shown in FIG. 7G, according to an embodiment.

FIGS. 8-13 are each drawings showing a front view of a paddle, according to various embodiments. Note that the back view of each paddle would be identical to the respective front view. All other structures not shown would be the same as described herein. In each of these figures, the first filler is shown which is inside the respective paddle and would not be visible to the user. Before the first filler is added, as described herein, the section where the first filler is shown was cored out (the gap). All of these embodiments also have the frame (with the second filler inside the frame) applied around the entire edge as described herein. Thus, all of the embodiments shown in FIG. 8-13 can be constructed using the process described herein, and can have the same general structure as shown in FIGS. 2-7I but for the different location and shape of the gap which was cored out of the original paddle and filled with the first filler. Note that other configurations of core and first filler can be used as well, and these are just examples. Note that in FIGS. 8-13, the first filler and the second filler are both not visible to the user as they are both embedded inside the paddle (the first filler being inside the game and the second filler being inside the frame). The paddles shown in FIGS. 8-13 would appear as shown in FIGS. 7A, 7B because any internal structures (first filler 400, second filler second filler 605, core 200, etc.) would not be visible as it would be covered by the front and back surfaces and possibly the frame 600.

In the embodiment shown in FIGS. 7D and 8-13, the gap and filler used to fill the gap were near the perimeter of the head (the head being opposite of the handle) of the paddle. In a further embodiment, the gap and filler used to fill the gap can be in other locations in the paddle (not just near the perimeter), although typically closer to the handle than the head. FIGS. 14-18 illustrate the method of constructing a paddle where the gap and filler used to fill the gap are present in various locations inside the paddle. Note that the construction process can be the same as shown with respect to FIGS. 1-13.

Figure 14:
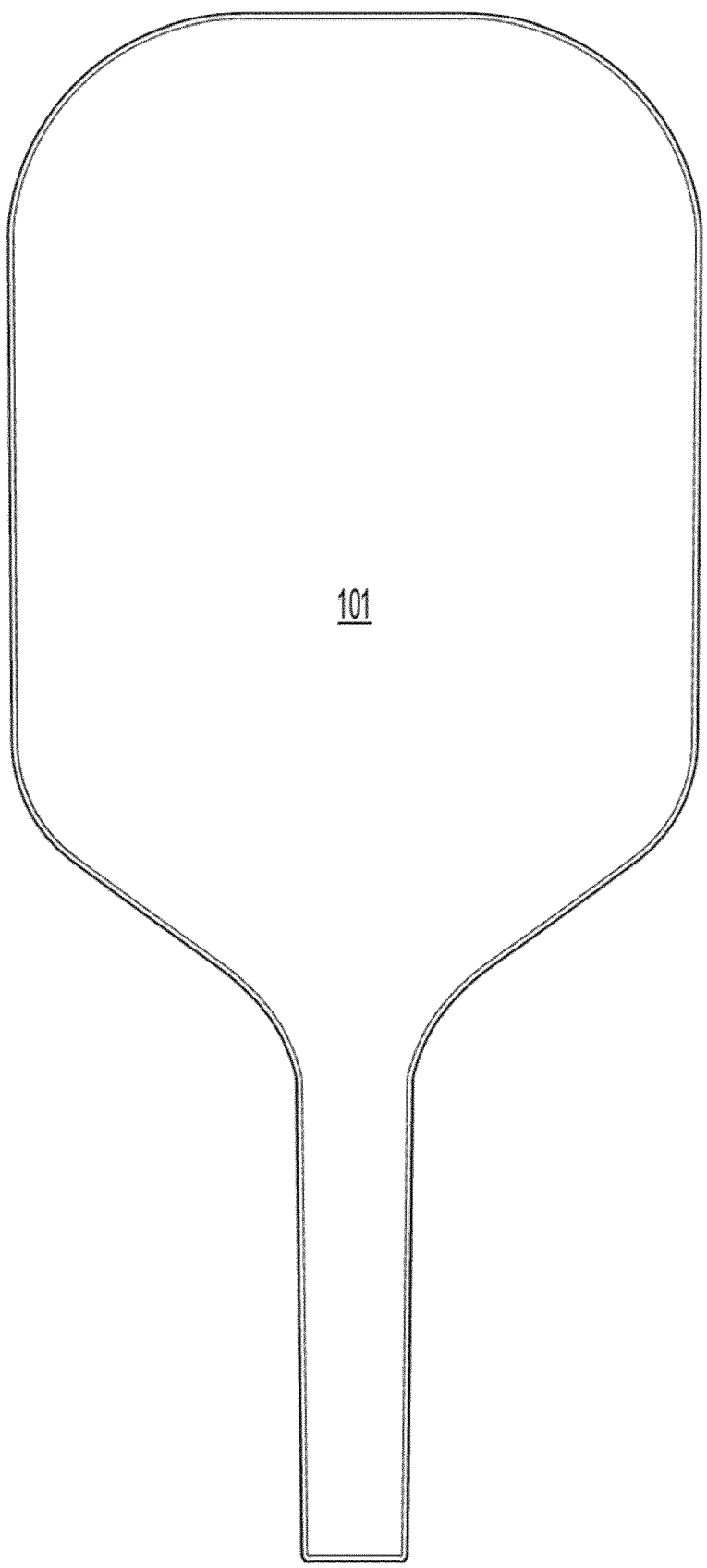
FIG. 14 is a front view showing another original paddle before it is cored out, according to an embodiment.

FIG. 14 is a front view showing another original paddle before it is cored out, according to an embodiment. FIGS. 15-19 show a process of how a dampener is applied to this original paddle. Note that the core is present throughout the another original paddle (as shown in other figures) and is surrounded by a front and back surface. The outer surfaces can be comprised of one, two, three, four or more layers of unidirectional or weave of carbon, glass, or any natural or synthetic fiber and prepreg, impregnated with any kind of resin. The core 200 can be comprised of a honeycomb structure of polypropylene, aluminum, Nomex, Kevlar or any other synthetic or natural material. The core is not limited to a honeycomb structure. The core can form the entire paddle (head and handle) or the head only. The core can be surrounded by an edge guard, or any type of frame, or edgeless.

Figure 15:
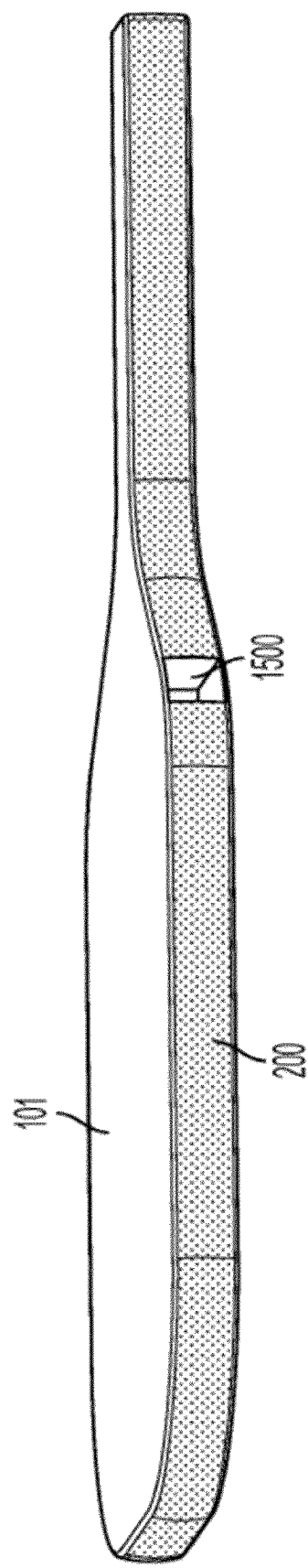
FIG. 15 is a perspective view showing a gap, according to an embodiment.
Figure 16:
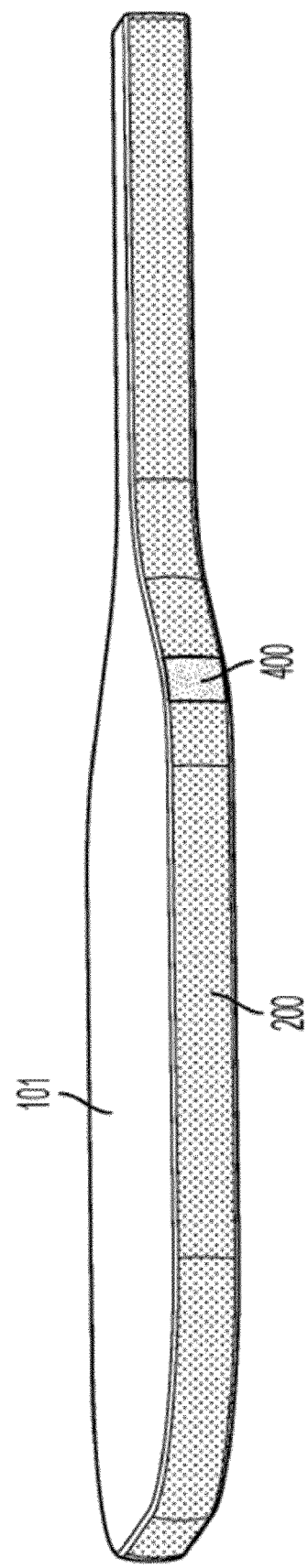
FIG. 16 is a perspective view showing first filler filling in the gap, according to an embodiment.
Figure 19:
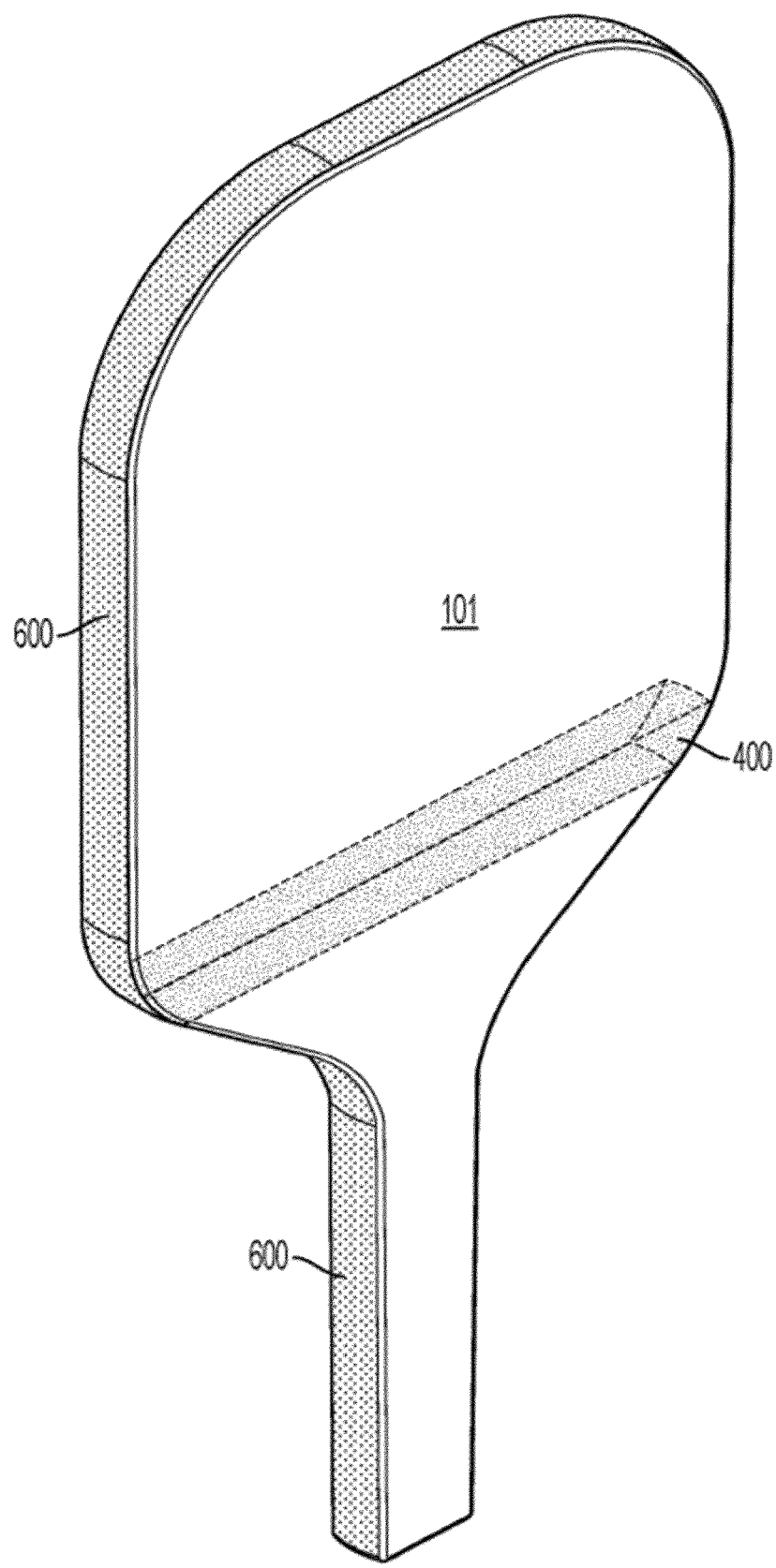
FIG. 19 is a perspective view showing a front of a paddle showing first filler on the inside, according to an embodiment.

FIG. 15 is a perspective view showing the paddle from FIG. 14 after it was cored out, according to an embodiment. Note that a gap 1500 in the core 1400 is where the core 1400 was drilled (or other process) to form the gap 1500. Note that the gap 1500 is near the handle 1501. FIG. 16 is a perspective view showing a first filler filling in the gap (as described herein), according to an embodiment. The gap 1500 (and hence the first filler) extends throughout the entire original paddle. Note that the gap 1500 extends throughout the paddle and out through the opposite side of the paddle. While the gap 1500 extends throughout the paddle, the paddle does not collapse into two sections because the front and back surface keep the paddle together until the first filler is inserted to fill the gap 1500. Because the gap is typically smaller than the total thickness of the paddle, leaving some part of the original core, which also helps the paddle to not collapse. FIG. 19 shows the first filler 1600 extending throughout the original paddle.

The gap 1500 is used to place the vibration dampener (first filler) but can also be hollow partially or completely. The gap can be of any dimension, cross section shape and any position, it can be continuous across all the paddle, or split into two, three, four or more sections of different lengths, widths, and shapes. It can be linear or curved, in the center of the paddle or in the edges. The gap can be inside the sandwich structure or also reach/pass the front and back surfaces. It can be on the head (edges, center, top, bottom), neck, or handle of the paddle. Multiple gaps can be used simultaneously in the same or different parts of the paddle. If the gap is located in the edges of the paddle, it can be exposed to the outside (on both edges of the paddle), or can be covered with a frame, edge guard or any other material or structure.

The gap 1500 is then filled with a first filler 1600. The first filler can be a foam, polymeric foam, solid, liquid, gel of any type of polymer, thermoplastic, thermoset, thermoplastic elastomer, elastomer, rubber, expandable material, and any other material or a mixture of them. The first filler can feel completely or partially the gap 1500. The first filler can be directly touching the core structure, or can be covered/ encapsulated by other material, for example a thermoplastic film or carbon fiber, not limited to these materials. If the gap 1500 reaches the surface, the first filler 1600 can be exposed on the surface or can be covered with glass fiber, carbon fiber, adhesive or any other material.

Figure 17:
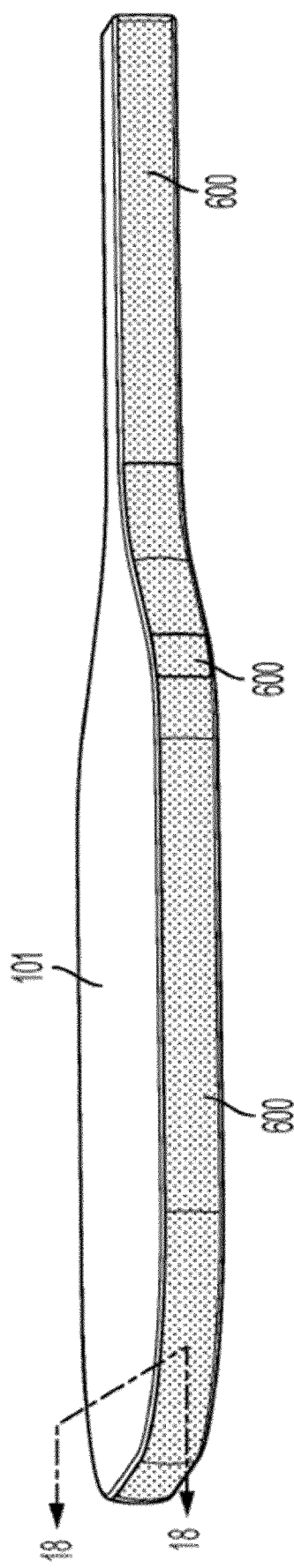
FIG. 17 is a perspective view showing a frame added to the edge of the paddle, according to an embodiment.

FIG. 17 is a perspective view showing a frame added to the edge of the paddle from FIG. 16, according to an embodiment. After the gap 1500 is filled with the first filler 1600, a frame 1700 can be added to the edge (perimeter) as described herein. Note that in some embodiments, where there is no gap on the edge of the paddle, adding the frame may not be necessary. The frame 1700 can have a second filler as described herein. Note that the final paddle will appear as shown in FIGS. 7A and 7B.

Figure 18:
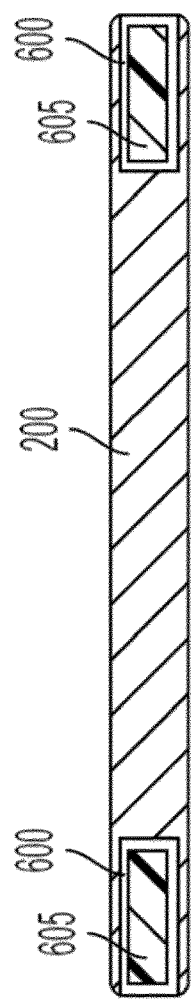
FIG. 18 is a cross section of FIG. 17 showing the core, first filler, and frame, according to an embodiment.

FIG. 18 is a cross section of FIG. 17 showing the core, foam, and carbon frame, according to an embodiment. The frame 1700 contains a second filler 1800. FIG. 19 is a perspective view showing a front of a completed paddle (FIG. 17) showing the first filler on the inside, according to an embodiment. The first filler 1600 is inside the gap 1500 cut inside the core 1400. The first filler 1600 is not visible to the user as it is entirely inside the paddle.

FIGS. 19-22 are each drawings showing a diagonal front view of a paddle, according to various embodiments. Note that the back view of each paddle would be identical to the respective front view. All other structures not shown would be the same as described herein. The paddles shown in FIGS. 19-22 can be constructed as described herein.

Figure 20:
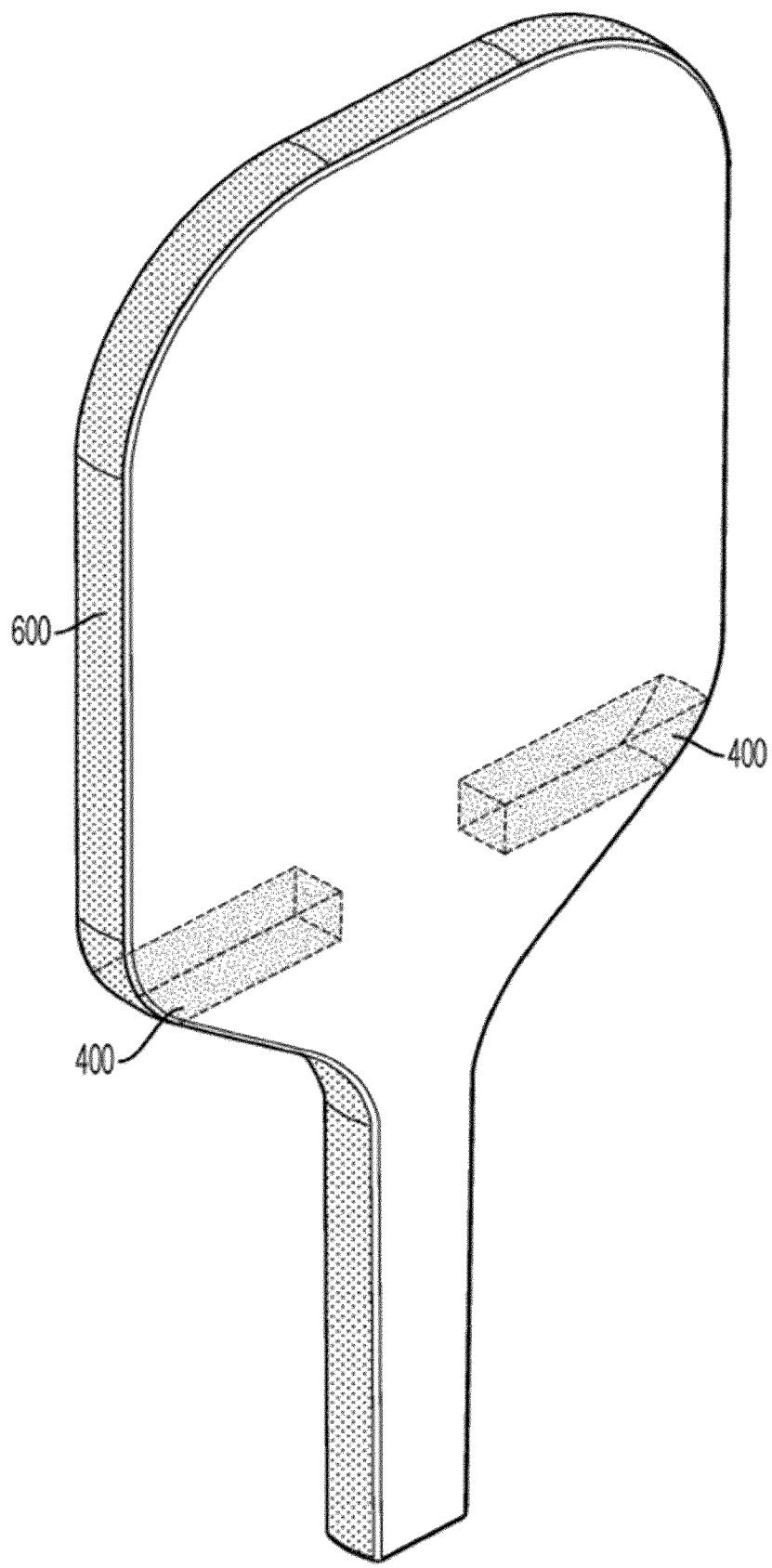
FIG. 20 is a perspective view showing a front of a different paddle showing first filler on the inside, according to an embodiment.
Figure 21:
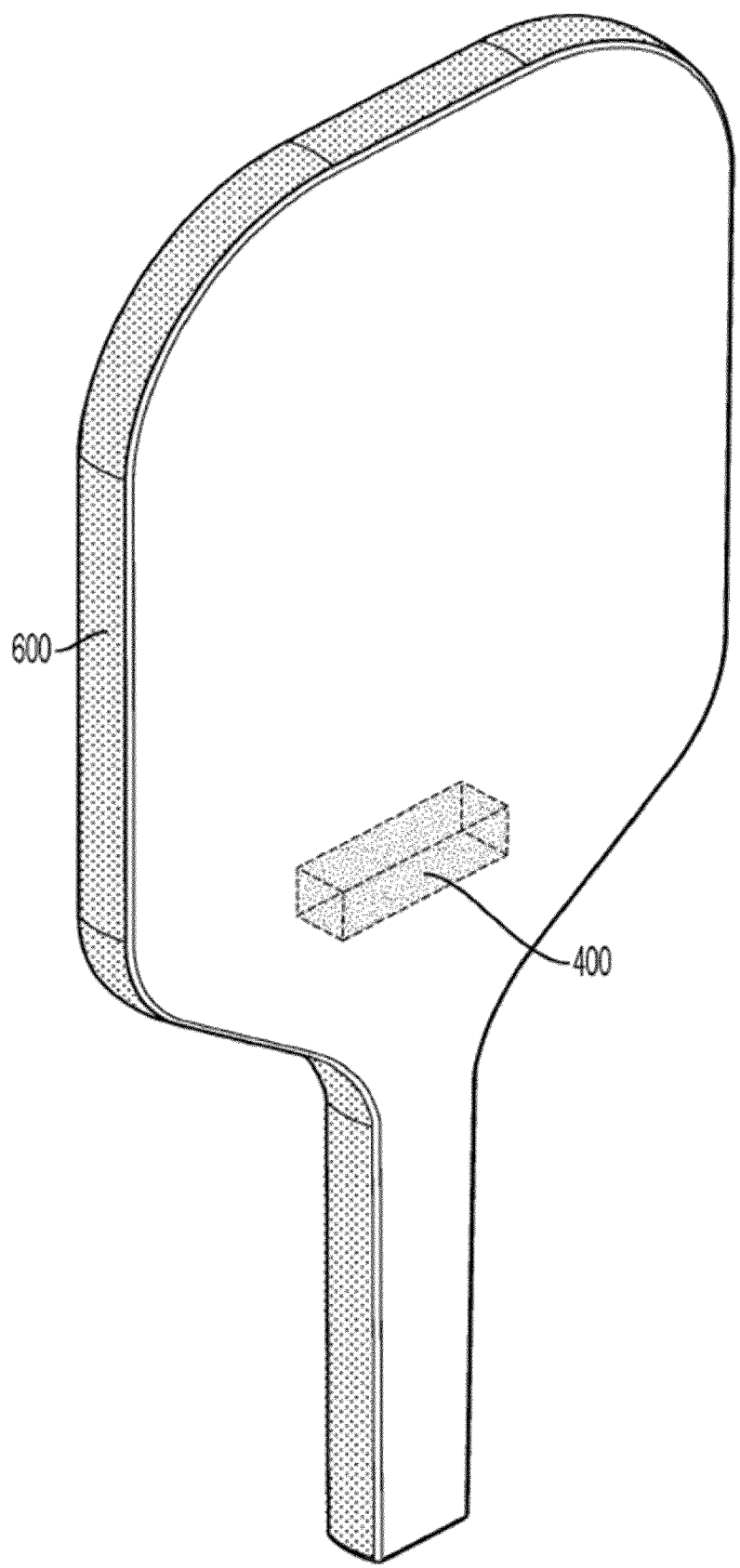
FIG. 21 is a perspective view showing a front of another different paddle showing first filler on the inside, according to an embodiment.

FIG. 19 is an example of a paddle showing the horizontal gap (and first filler) across the entire paddle, and was shown being constructed in FIGS. 15-18. FIG. 20 is an example of a paddle showing the horizontal gap (and first filler) just in the sides of the paddle. FIG. 21 is an example of a paddle showing the horizontal gap (and first filler) just in the center of the paddle. The gap (and first filler) is not limited to these examples or to horizontal gaps, and other shapes, dimensions, and configurations can be used as well. Note in FIGS. 19-21 (as in FIGS. 7D and 8-13), the first filler is completely inside the paddle and is not visible to the user. The second filler is also completely inside the paddle (inside the frame) and is also not visible to the user.

Note that when the gap and first filler is entirely in-between the head and the handle (the throat), it can be referred to as a dampener (such as shown in FIGS. 19-21. In other words, a dampener does not have any portion of filler outside of the throat of the paddle (e.g., above the throat line or below the top of the handle). Note that when the gap and the first filler is near the perimeter/edges of the paddle (such as shown in FIGS. 7D and 8-13 then it can affect properties of the paddle, which can for example increase spin and boost of the ball This can be because the first filler (e.g., foam) inside the paddle, in one embodiment, can slightly vibrate when the paddle strikes a ball, which enhances the feel of the player when striking the ball. A dampener can reduce vibration on the handle. Note that in an embodiment, a dampener can be considered a piece of foam that is entirely inside the throat of the paddle. Note that in an embodiment, using the frame as described herein can be optional. In one embodiment, if a paddle contains a dampener, then there would not be a frame used.

Note that the ratio of volume of first filler to volume of the core can be relatively large (meaning there is a relatively large amount of first filler used in the paddle). For example, in a particular paddle, a ratio r=volume of all first filler/ volume of all core. In an embodiment, the ratio r can be 5%. In another embodiment, r can be from 5% to 75%. In another embodiment, r can be from 25% to 50%. In another embodiment, r can be from 10% to 20%. In an embodiment, an acceptable range of r would be from 1% to 30%.

Figure 8:
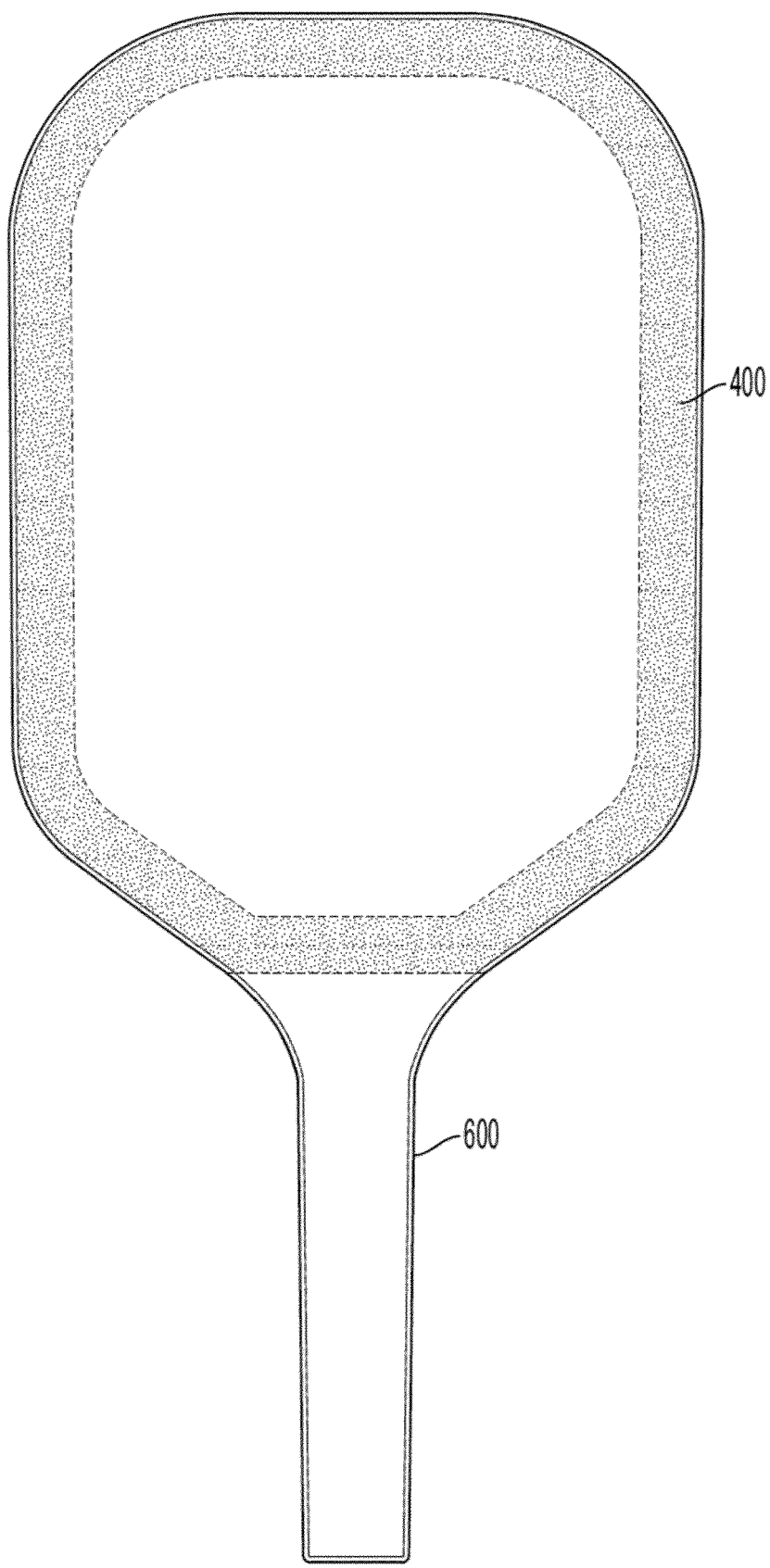
FIGS. 8-13 are each drawings showing a front view of a paddle, according to various embodiments.
Figure 9:
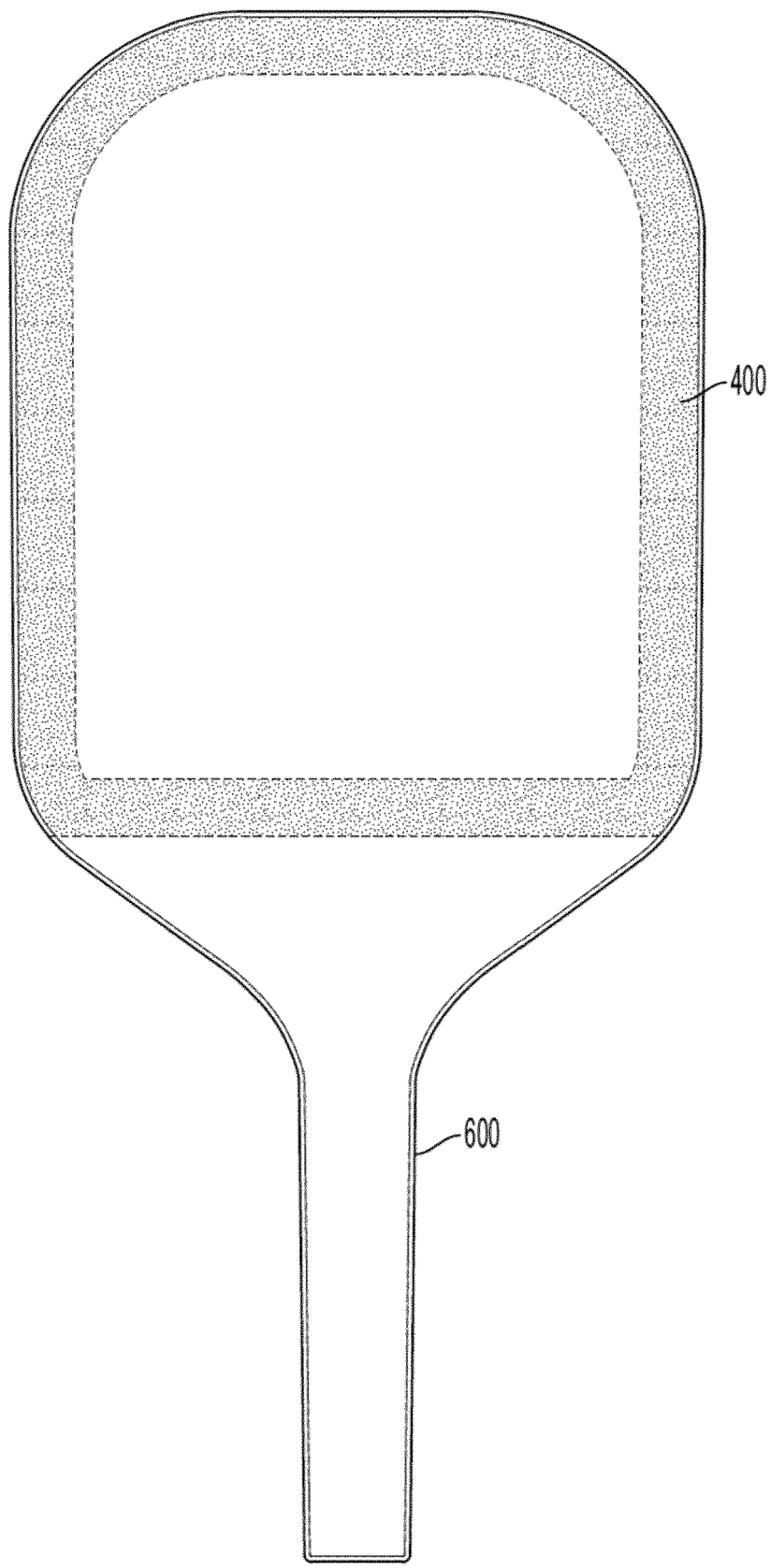
Figure 10:
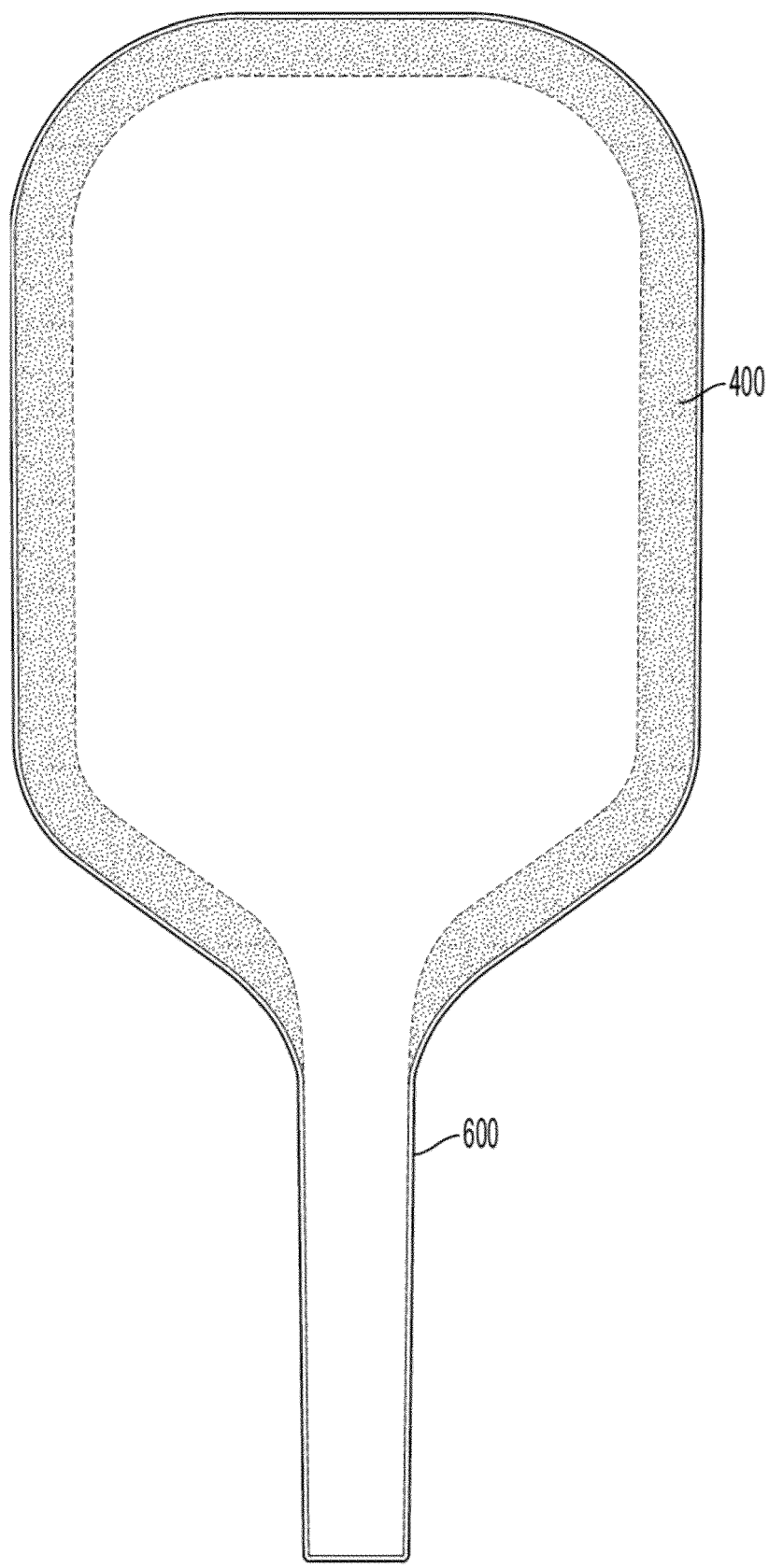
Figure 11:
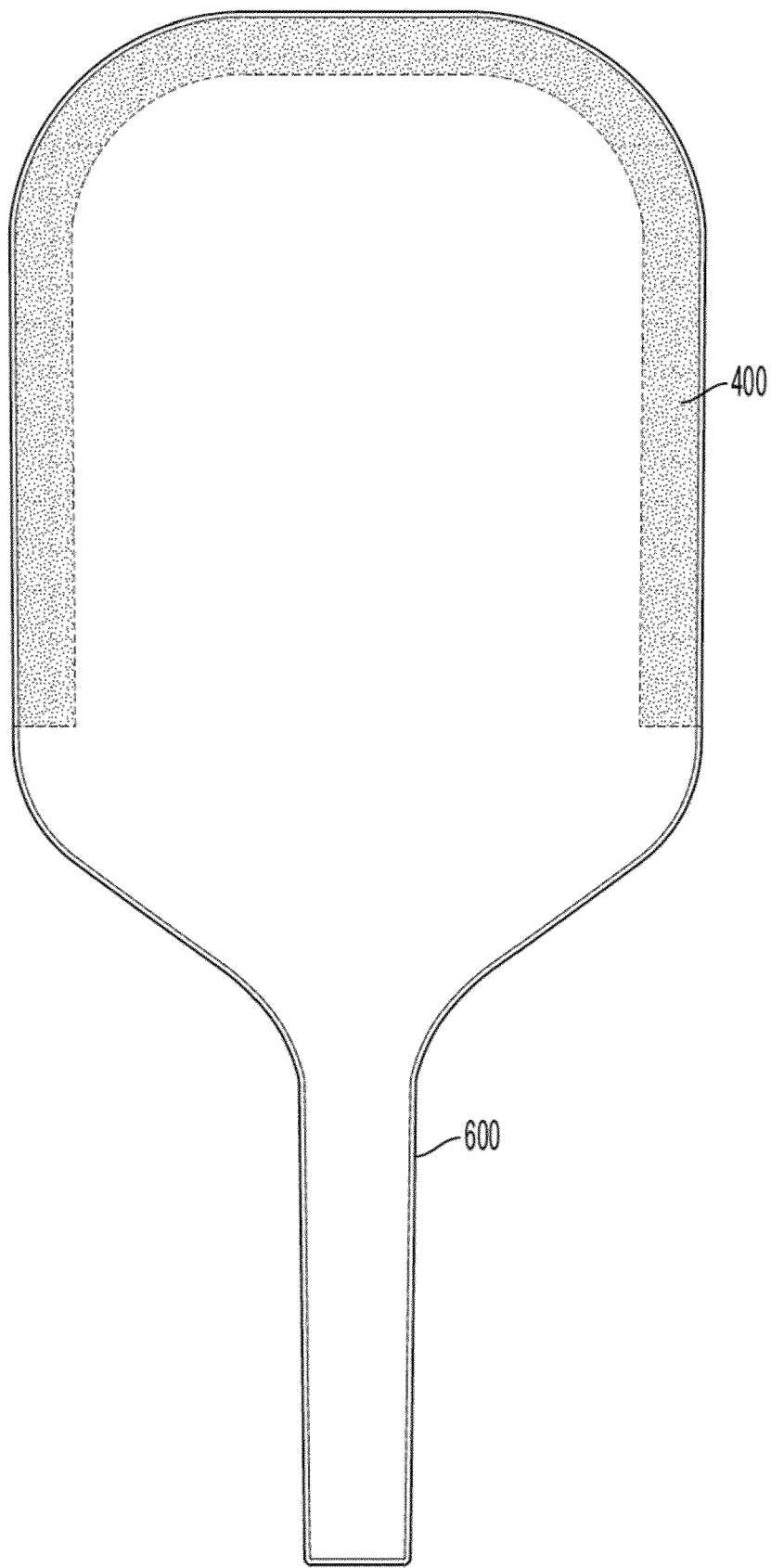
Figure 12:
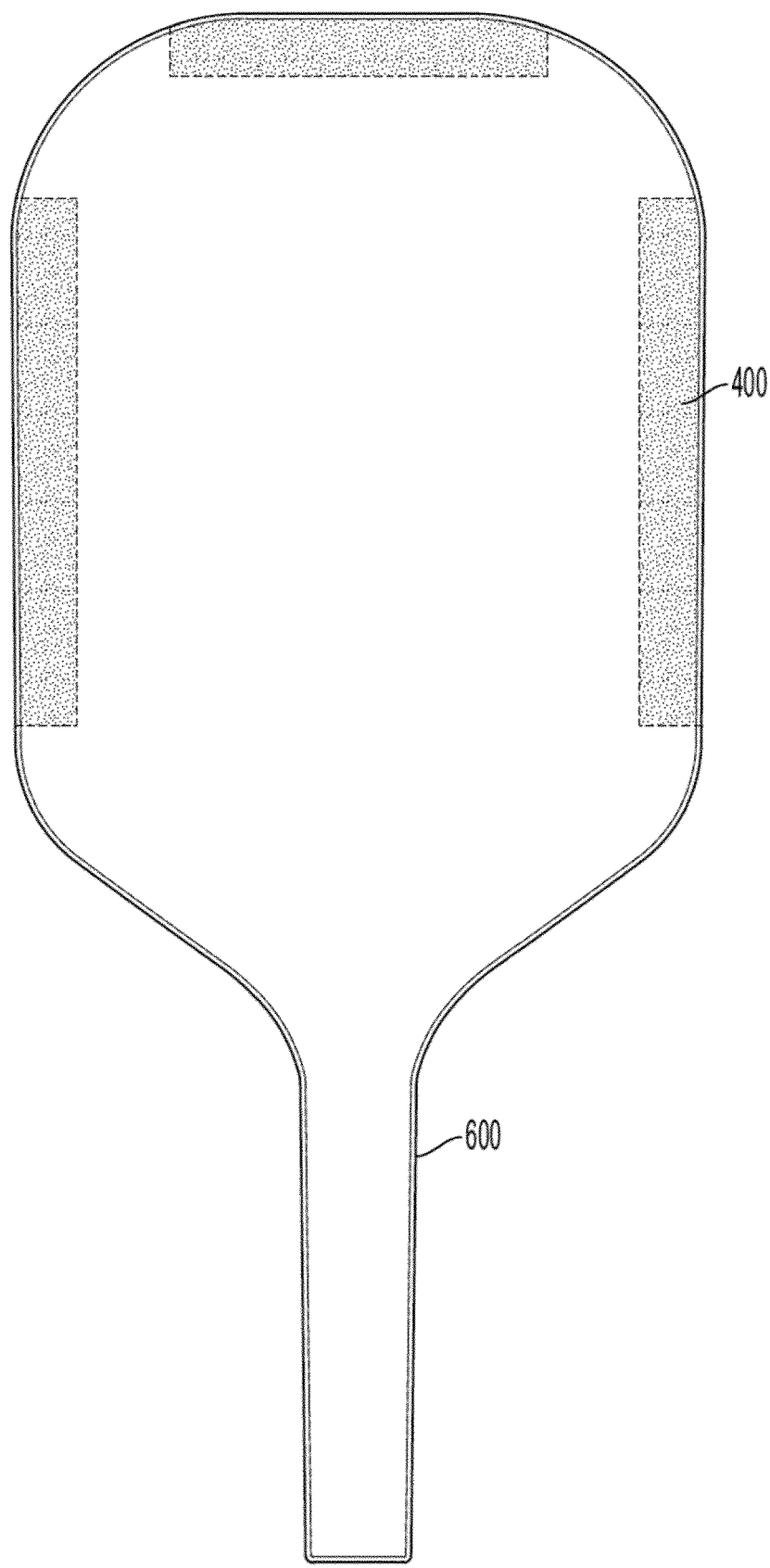
Figure 13:
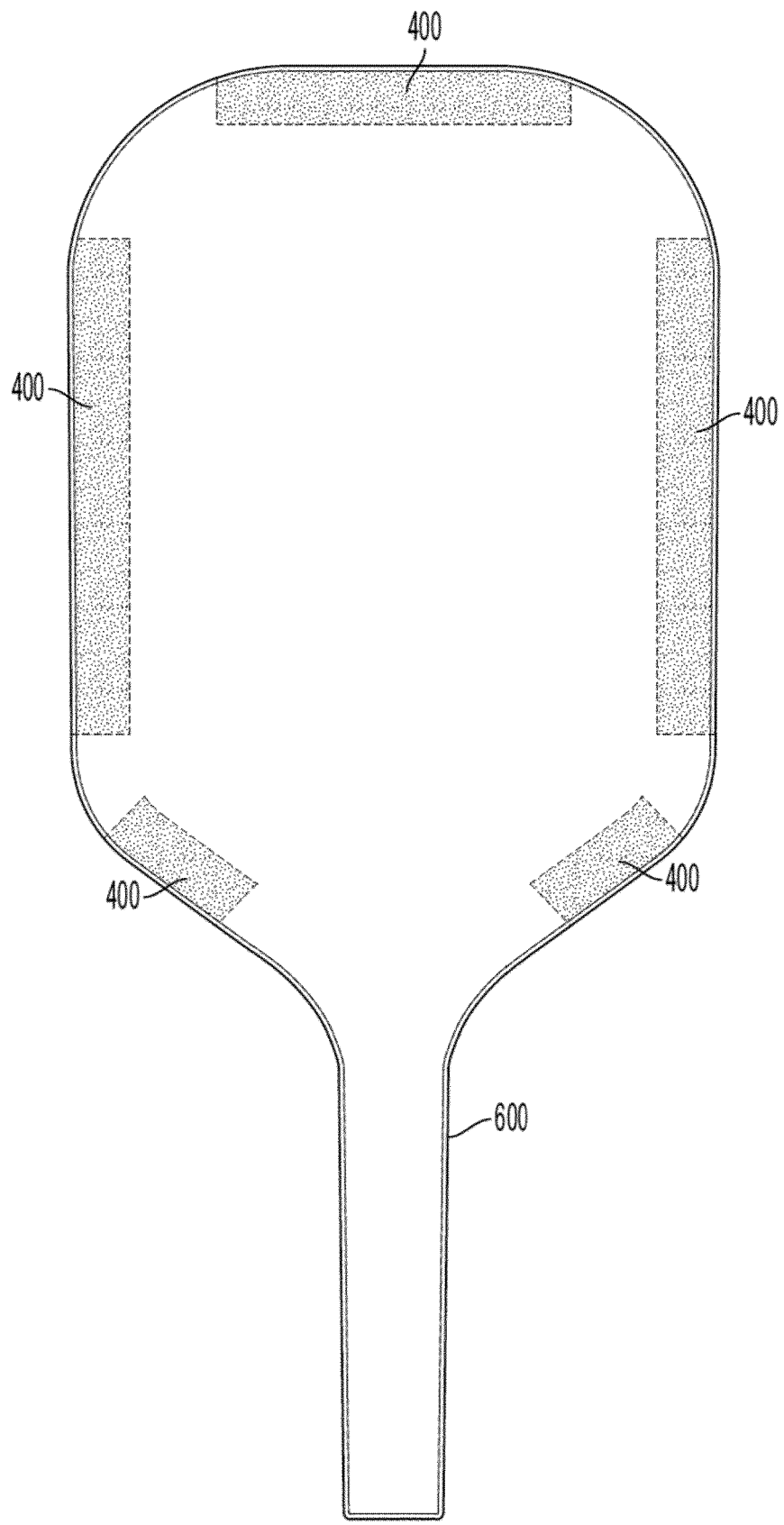
Figure 22:
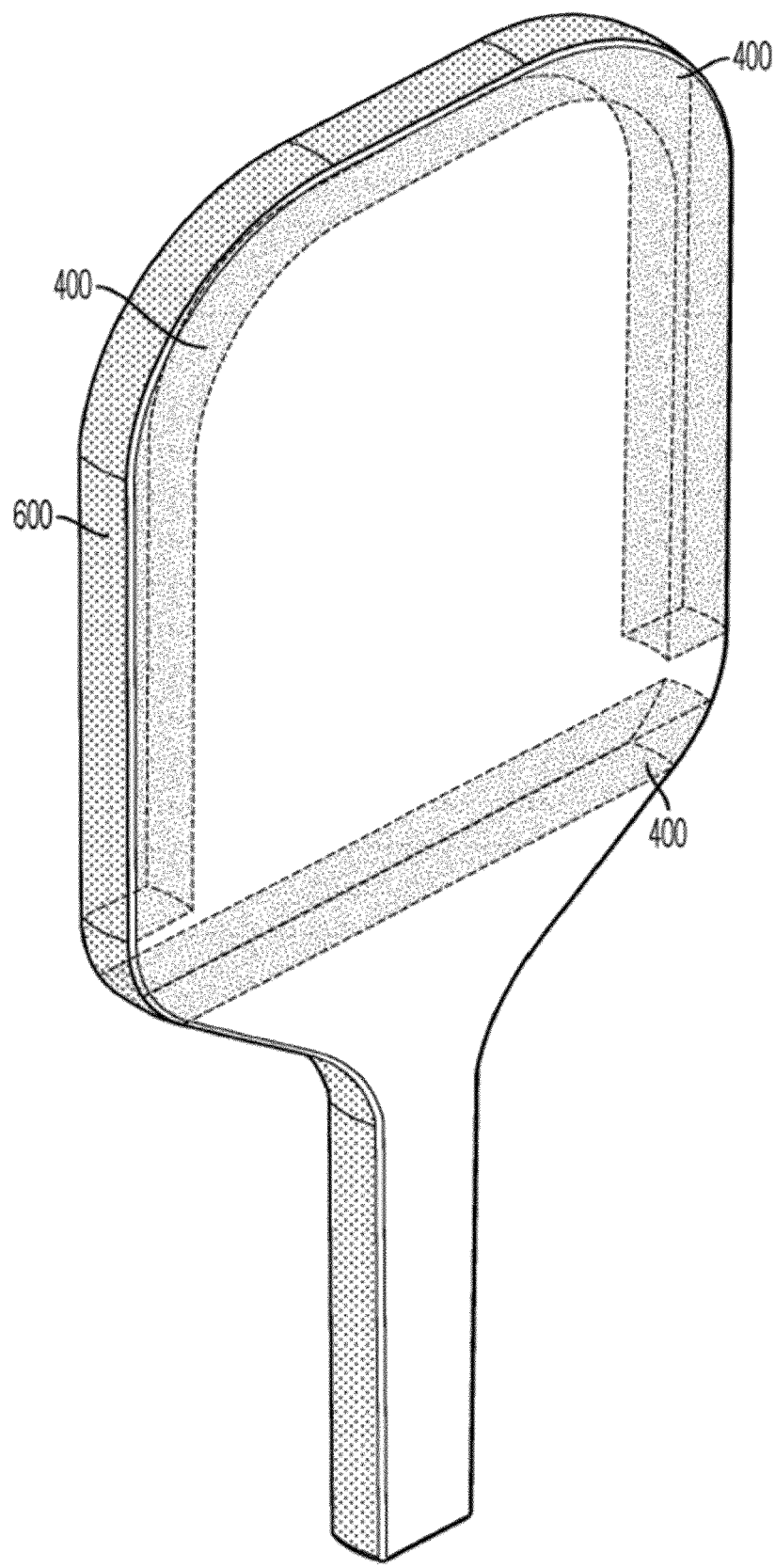
FIG. 22 is a perspective view showing a front of another alternative paddle showing first filler on the inside, according to an embodiment.

Note that both a dampener (gap with filler between the head and the handle) and gap with filler near the edge can also be combined into the same paddle, see FIGS. 8, 9, 22. FIG. 22 is a perspective view showing a front of another alternative paddle showing first filler both around the perimeter as well is throughout a section between the head and the handle, according to an embodiment.

Figure 23:
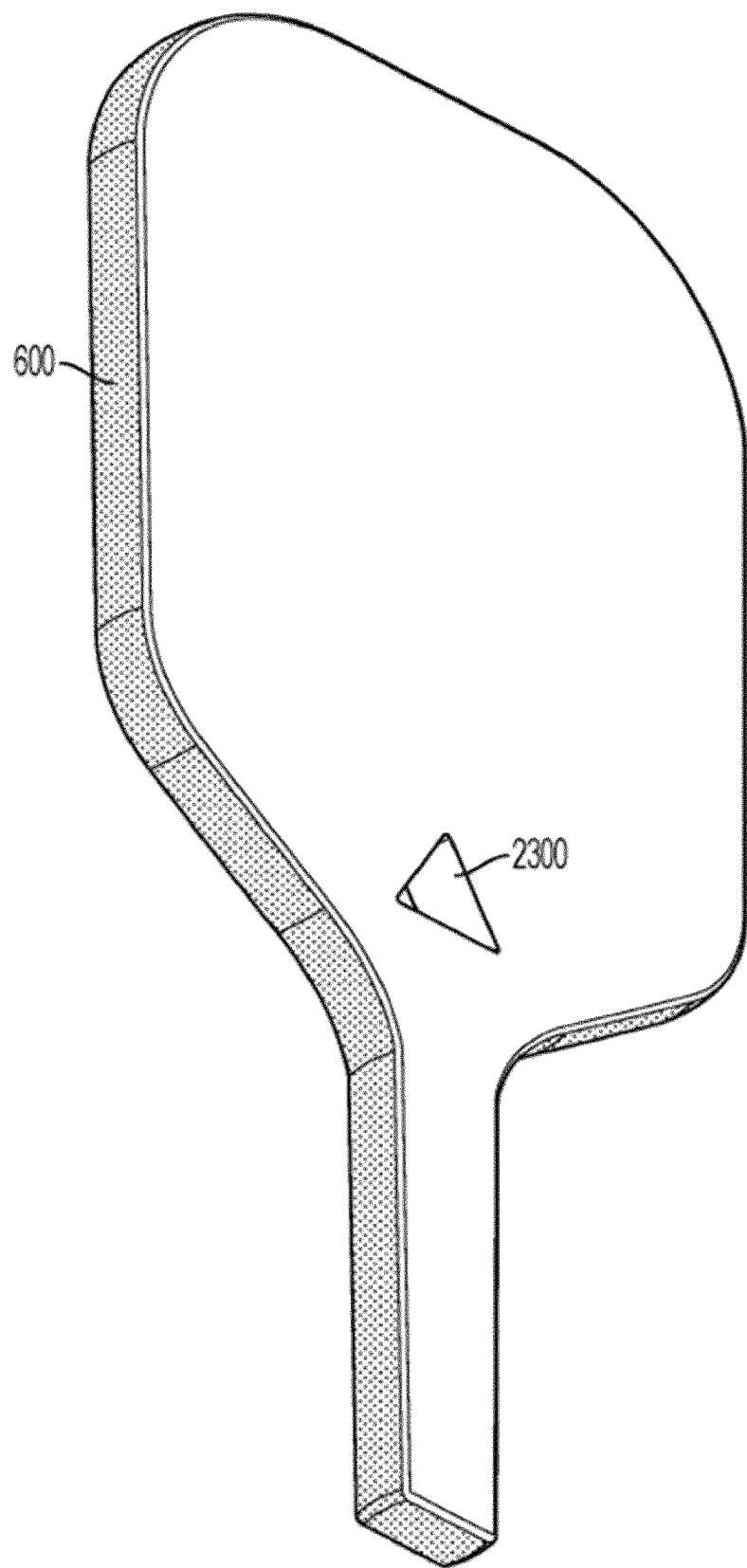
FIG. 23 is a perspective view of a paddle with filler in the throat, according to an embodiment.

FIG. 23 is a perspective view of a paddle with a gap cut through the front and back surfaces, according to an embodiment. Note in this embodiment, a gap 2300 is cut throughout the core, front and back surface of the paddle.

Figure 24:
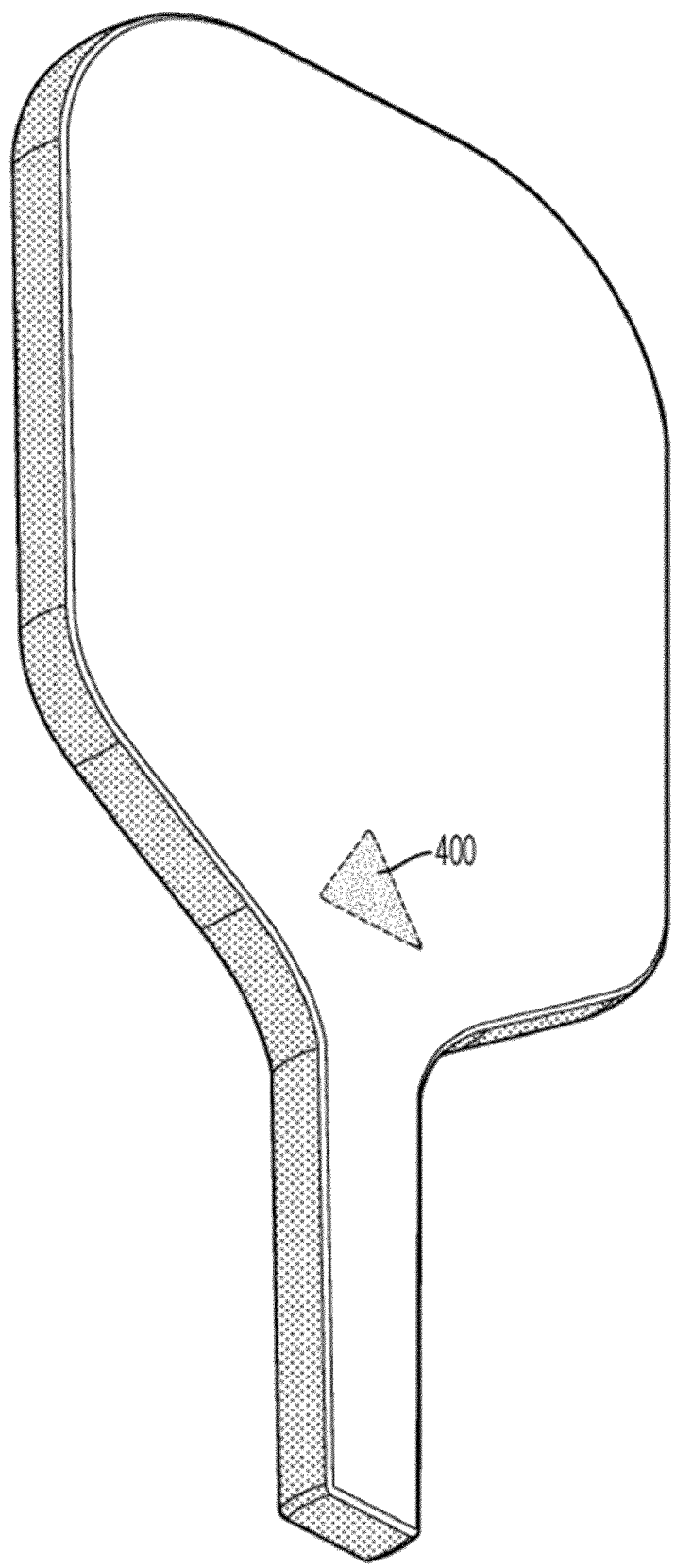
FIG. 24 is a perspective view of the final paddle, according to an embodiment.

FIG. 24 is a perspective view of the paddle with the gap cut through the front and back surfaces with filler, according to an embodiment. A first filler 2400 is inserted into the gap 2300. The front surface and back surface can then be coated with an external coating (but alternatively could be visible without any coating/cover), such as a carbon fiber layer, to cover the entire front and back surface including the first filler 2400. As such, the first filler 2400 would not be visible to a user after the external coating is applied. FIGS. 17, 19-22 and 24 would all appear visually as FIGS. 7A, 7B since all of the internal structures (e.g., core 200, first filler 400, second filler 605, etc.) would be covered by the front and back surfaces and possible the frame 600.

Figure 25:
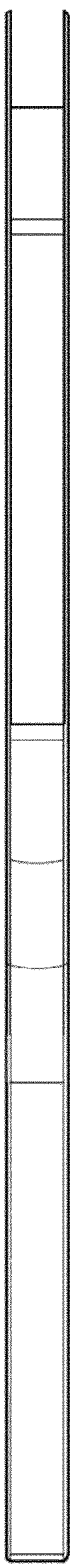
FIG. 25 is a left side view of a final paddle, according to an embodiment.
Figure 26:
FIG. 26 is a right side view of the final paddle, according to an embodiment.
Figure 27:
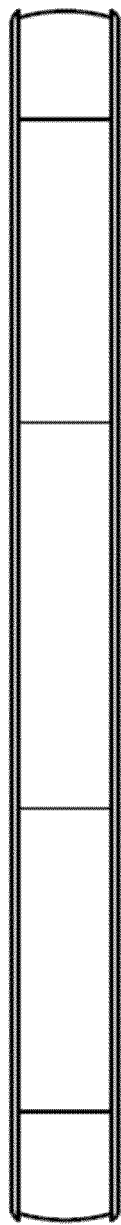
FIG. 27 is a top view of the final paddle, according to an embodiment.
Figure 28:
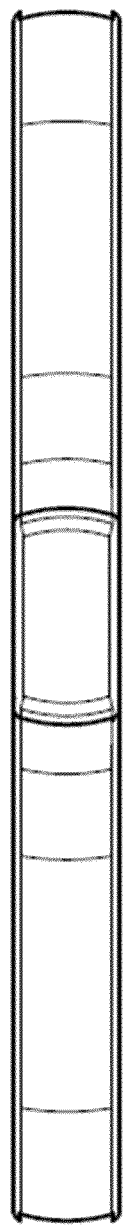
FIG. 28 is a bottom view of the final paddle, according to an embodiment.

FIG. 25 is a left side view of a completed paddle, according to an embodiment. FIG. 26 is a right side view of the completed paddle, according to an embodiment. FIG. 27 is a top view of the completed paddle, according to an embodiment. FIG. 28 is a bottom view of the completed paddle, according to an embodiment. Note that a completed (finished) paddle can appear on the outside as shown in FIGS. 7A and 7B as well as FIGS. 25-28. Note that the surfaces shown in FIGS. 25-28 are all frame 600 although the shading does not match the shading used in the other FIGS with regard to the frame 600 in order to show the contours.

Figure 29:
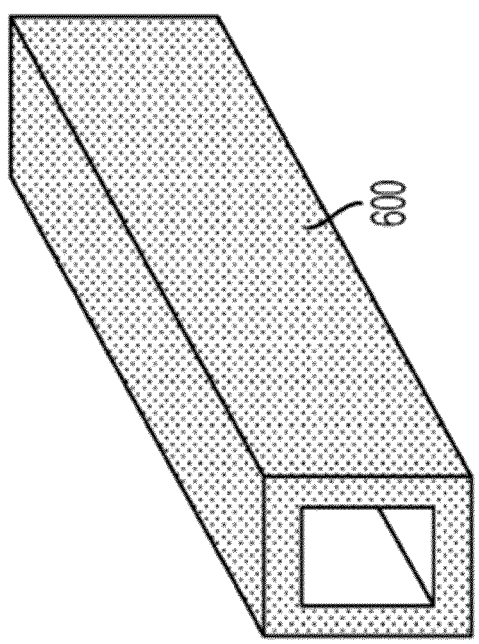
FIG. 29 is a drawing showing a perspective view of the frame, according to an embodiment.

FIG. 29 is a drawing showing a perspective view of the frame, according to an embodiment. Shown is the frame which can be made out of carbon or other material. The frame (before curing/heating) is malleable so it can be bent around the perimeter of the paddle. It can be glued onto the edge of the paddle using glue or other adhesive. While shown with an open face in FIG. 29, the face can be closed (sealed) on both ends, thereby creating an airtight frame in which pressurized air or other materials can be sealed therein.

Figure 30:
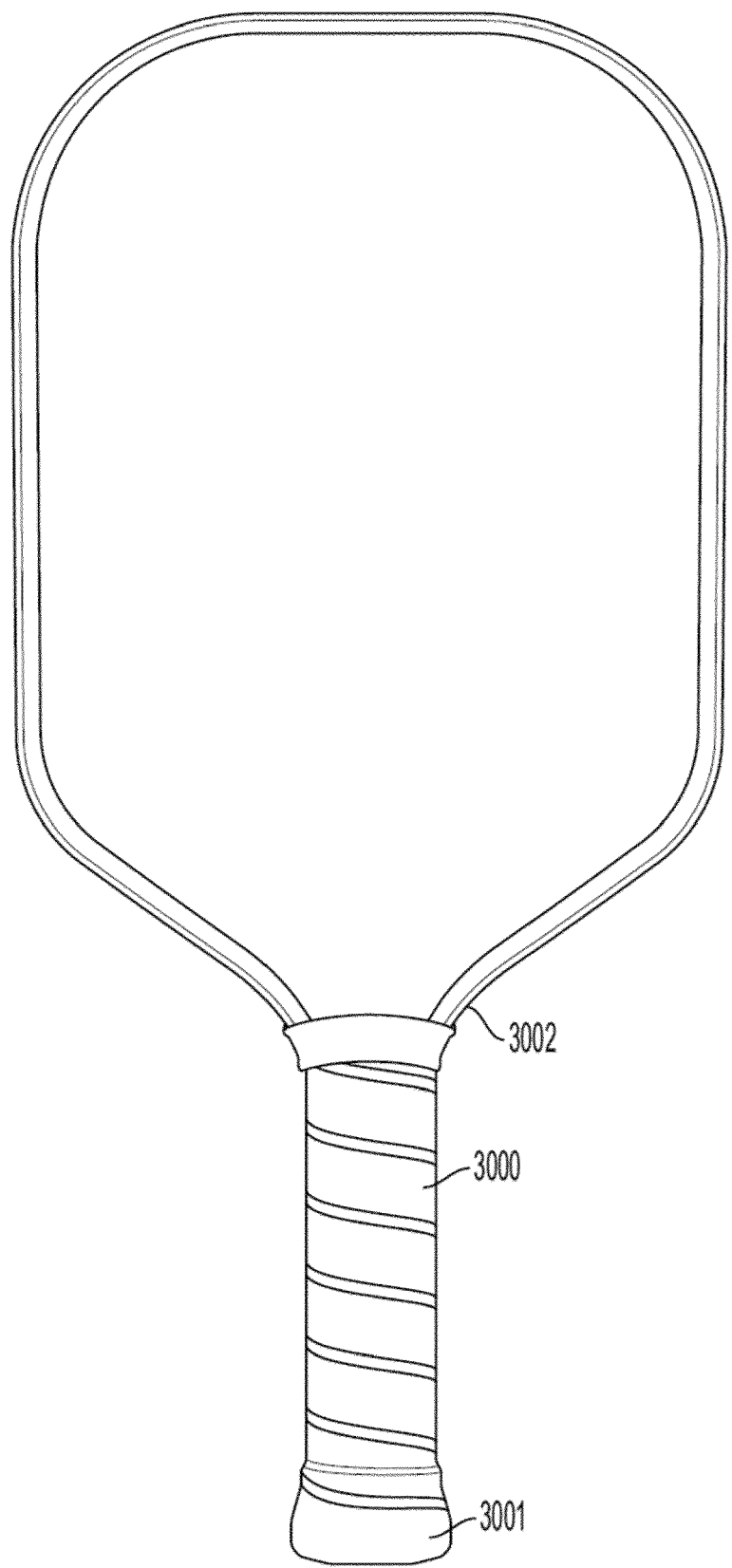
FIG. 30 is a drawing of a final paddle, according to an embodiment.

FIG. 30 is a drawing of a completed paddle, according to an embodiment. The paddle can have an optional grip 3000, an optional end cap 3001, and an optional edge guard 3002. The edge guard can be used or not to cover the frame and a small area of the surfaces on both sides. The edge guard can be made from PVC, any type of polymer, thermoplastic, thermoset, elastomer, rubber, foam, expandable material, or a mixture of any of these. Example dimensions (in inches) for such a paddle can be, 15-17" (length)×9-7" (width), or 16.5"×7.5" or 16"×8". Grip length: 4-6", or 4.75-5.75". Grip circumference: 4-4.5", or 4-4.3", although these are just examples and any other dimensions can be used. When determining the locations/dimensions of the head, throat, handle, face, etc., the edge guard, end cap, and grip are not used.

Figure 31:
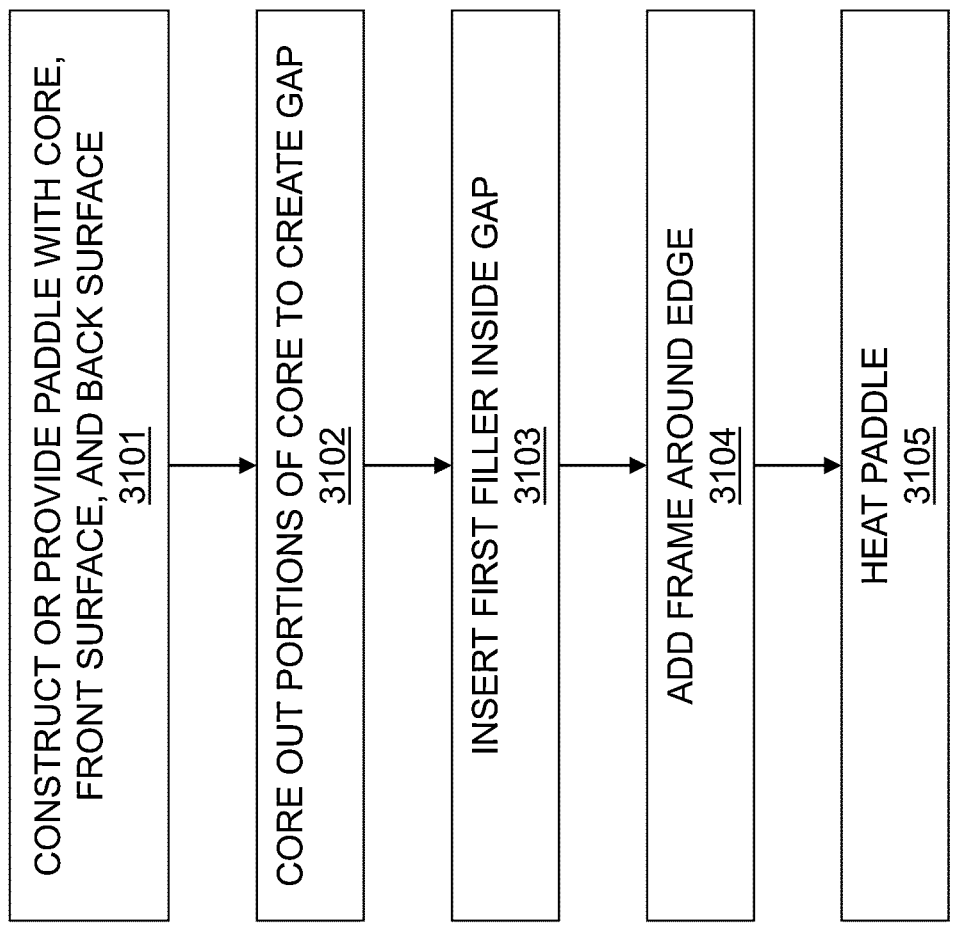
FIG. 31 is a flowchart illustrating a method used to construct a paddle, according to an embodiment.

FIG. 31 is a flowchart illustrating a method used to construct a paddle, according to an embodiment. This method (and its individual operations) can be used to construct any paddle described or illustrated herein. All operations described herein can be applied to any embodiment described herein.

In operation 3101, an original paddle can be constructed or provided. The original paddle will be constructed from core which can be comprised of any open-cell structure or lattice of polypropylene, aluminum, Nomex, Kevlar or any other synthetic or natural material. Outer surfaces (e.g., front surface and back surface) can be comprised of any material, for example one, two, three, four or more layers of unidirectional or weave of carbon, glass, or any natural or synthetic fiber and prepreg, impregnated with any kind of resin are commonly used for the outer surface. The front and back surface can be glued to the core, creating a "sandwich" of core between the front and back surfaces. See FIGS. 1A, 1B, 1C for an original paddle. Note that in an embodiment, the front and back surface can be glued onto the core after the core is cored out, providing easier access to the core.

From operation 3101, the method can proceed to operation 3102, in which portions of the core are cored out (removed) to create a gap. This can be done by using a tool such as a router, running drill, press, saw, or any other mechanical tool. The coring can be performed through edges of the paddle (See FIG. 2). In the embodiment where the intended gap does not touch the edge of the core, then the coring out of the core could be performed before assembling the sandwich structure (e.g., before attaching the front surface and back surface to the core). This method of coring out the core can also be done even if the gap does touch the edge of the core. The gap can be from 0.1 to 100 mm depth (from the edge to the center of the paddle), it can be continuous around all the paddle, or split in two, three, four or more sections of different lengths, depths, and shapes. The height of the gap can vary from 0.1 to 25 mm or to the max thickness of the core. The gap can be of any shape, concave, convex, U shape, or others. There can also be shapes created within the core while the core is attached to the edge.

From operation 3102, the method proceeds to operation 3103, in which a filler (first filler) is placed (inserted) into the gap. The filler can be pressurized (e.g., in a can) and sprayed in, or can be spread inside the gap using a tool (e.g., applicator gun (such as a foam dispensing gun), etc. The gap can be entirely filled in with the first filler or some gaps can still remain. In an embodiment, the first filler can be cut to the exact shape of the gap and added by hand. The first filler can be an empty space (or pressured air and the frame can be airtight), or filled with any type of polymer, thermoplastic, thermoset, thermoplastic elastomer, elastomer, rubber, foam, polymeric foam, expandable material, or a mixture of them. The first filler material can be expandable, for example if the first filler material is foam it can be expandable form. The first filler can be of any cross-section shape, the height can vary from 1 to 25 mm or to the max thickness of the core, the width (distance from the frame wall to the core) can vary from 0.1 to 50 mm. According to the gap geometries and shape, the first filler can be continuous around all the core or can be split in two, three, or more sections with same or different geometries, dimensions, and materials. The first filler can surround the entire paddle, just the head, or just specific areas.

From operation 3103, the method can proceed to operation 3104, which adds the frame to the edge of the paddle. The frame is a hollow cuboid structure (or other structure which does not have to be hollow) which wraps around the entire edge of the paddle. The frame can be bendable in order to mold it to the shape of the edge of the paddle. An adhesive (e.g., glue, cement, etc.) can be used to adhere the frame to the paddle. The frame (e.g., carbon frame) is bendable before the heating operation, but after the heating the resin sets and the frame becomes hard. The frame can be adhered to the paddle by the resin in the carbon fiber and because it gets hard it won't change the shape of the frame. The frame can be made of carbon, glass, fiberglass, thermoplastic, or any synthetic or natural fiber with resin, plastic, rubber, metal, or any material that provides a rigid structure. To make the carbon frame, a sheet of carbon fiber prepreg (impregnated with thermoset resin) is rolled to form a tube structure. Inside this tube there's a piece (continuous and long, about the same length of the tube) of the second filler (such as expandable foam). The frame can be of any cross-section shape, height, width, and length. It can be an entire piece or can be split in two, three, or more sections with same or different geometries and dimensions. The frame can surround the entire paddle, just the head, just the handle, or just specific areas.

The frame can be hollow or filled with a filler (second filler). This second filler can be of any polymer, thermoplastic, thermoset, thermoplastic elastomer, elastomer, rubber, foam, polymeric foam, expandable material, or a mixture of them. The second filler can be of any density, viscosity, and hardness. The second filler can be inserted into the frame using a number of alternate methods (in addition to those described herein), such as blowing it inside, injecting it, pressuring the second filler and then shooting it inside the frame, etc. The second filler (e.g., expandable foam) can be inserted into carbon frame by hand, it is a solid piece before the hot molding process. The second filler can also be air and the frame can be airtight.

From operation 3104, the method proceeds to operation 3105, which heats up the paddle. Once the first filler has been added to the paddle (inside gap(s) in the core) and the frame has been added to surround the paddle, and the second filler is added inside the frame, and the front and back surface are attached (e.g., glued) to the core, then the paddle can be placed inside a mold. The frame can be bent around the edge (perimeter) of the paddle. The paddle can then be heated in the mold which has a shape to match the paddle. The mold is closed with high pressure inside and the temperature is raised inside the mold to around 100 degrees Celsius or more for 2-20 minutes or more. With the high temperature, the second filler inside the frame expands so the frame gets its shape. The first filler inside the gap(s) also can expand therein. If expandable foam (e.g., a polymer with a foamy agent) is being used for the first filler and/or the second filler, then the expandable foam can expand and harden when heated. Also, with the high temperature, the resin impregnated in the frame sets (becomes hard) so it will be a solid piece after the mold is opened.

Note that all features, embodiments, method, step, etc., can be applied to any other embodiment described herein. In addition, all features, embodiments, methods, steps, etc., can be combined with any other without limitation. In addition, all paddles herein are (unless stated otherwise) symmetrical, that is the back side/surface would be identical to the front side/surface. For any side or portion of any paddle that is not shown or described in the drawings/specification, that side or portion can be identical (symmetrical) to its corresponding side or portion that has been shown (or identical/symmetrical to other paddles shown herein). For example, if the left side of a paddle is shown, if the right side of the paddle is not shown or described, it can be assumed that the appearance and structure of the right side is identical to the left. If the bottom of a paddle is not shown, it can be assumed that the bottom of that paddle is identical to a bottom shown of any other paddle shown herein. As such, parts and structures described herein can be combined and mixed without limitation. The same would hold true for front and back surfaces, etc. Any part mentioned or illustrated can be made from any suitable material, including any material mentioned herein.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A pickleball paddle, comprising:
   a front surface;
   a back surface opposing the front surface;
   a core disposed between the front surface and the back surface, the core having an outer boundary including:
   (i) a first portion shaped and dimensioned to terminate internal to, and spaced apart from, an internal perimeter of the pickleball paddle, and (ii) a second portion shaped and dimensioned to terminate closer to the internal perimeter of the pickleball paddle relative to the first portion;
   a gap formed as a void external to the core and positioned between the outer boundary of the core and the internal perimeter of the pickleball paddle, the gap extending around at least the first portion of the outer boundary of the core;
   a first filler disposed within at least a portion of the gap beyond the outer boundary of the core;
   a frame disposed about at least a head portion of the pickleball paddle along an edge portion thereof, the frame at least partially disposed between the front surface and the back surface along the edge portion, the frame defining a hollow interior portion; and
   a second filler disposed within at least a portion of the hollow interior portion of the frame.

2. The pickleball paddle of claim 1, wherein one or more of the first filler and the second filler includes a foam material.

3. The pickleball paddle of claim 1, wherein one or more of the first filler and the second filler include at least one of: a polymer, a thermoplastic, a thermoset material, a thermoplastic elastomer, an elastomer, a rubber, and an expandable material.

4. The pickleball paddle of claim 1, wherein one or more of the first filler and the second filler includes pressurized air.

5. The pickleball paddle of claim 1, wherein the second filler and the first filler are the same material.

6. The pickleball paddle of claim 1, wherein the second filler and the first filler are different materials.

7. The pickleball paddle of claim 1, wherein the gap is disposed, at least in part, between the frame and the core.

8. The pickleball paddle of claim 7, wherein the gap borders the frame.

9. The pickleball paddle of claim 1, wherein the frame surrounds the entire pickleball paddle.

10. The pickleball paddle of claim 1, wherein the frame include carbon fiber.

11. The pickleball paddle of claim 1, wherein the frame is a hollow cuboid structure.

12. The pickleball paddle of claim 11, wherein the hollow cuboid structure is formed from a single piece of material.

13. The pickleball paddle of claim 1, wherein the core at least partially includes a honeycomb structure.

14. The pickleball paddle of claim 1, further comprising an edge guard covering at least a portion of the frame along at least part of the head portion of the pickleball paddle.

15. The pickleball paddle of claim 1, wherein the outer boundary of the core further includes a third portion connecting the first portion and the second portion, the third portion projecting inwardly away from the internal perimeter of the pickleball paddle.

16. The pickleball paddle of claim 1, wherein the second filler is an expandable foam.

17. The pickleball paddle of claim 1, wherein the second filler is air.

18. The pickleball paddle of claim 1, wherein the first filler includes a vibration dampener.

19. The pickleball paddle of claim 1, wherein the first filler partially fills the gap.

20. The pickleball paddle of claim 1, wherein the frame defines an airtight structure.

* * * * *